United States Patent
Cheng et al.

(10) Patent No.: US 10,623,150 B2
(45) Date of Patent: Apr. 14, 2020

(54) CONTROL INFORMATION TRANSMISSION METHOD, USER EQUIPMENT, AND BASE STATION

(71) Applicant: Huawei Technologies Co., Ltd., Shenzhen (CN)

(72) Inventors: Yan Cheng, Beijing (CN); Bo Li, Beijing (CN); David jean-marie Mazzarese, Beijing (CN); Lixia Xue, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

(21) Appl. No.: 15/974,938

(22) Filed: May 9, 2018

(65) Prior Publication Data

US 2018/0254862 A1    Sep. 6, 2018

Related U.S. Application Data

(63) Continuation of application No. 15/084,122, filed on Mar. 29, 2016, now Pat. No. 9,998,259, which is a
(Continued)

(51) Int. Cl.
*H04L 1/18*    (2006.01)
*H04L 5/00*    (2006.01)
(Continued)

(52) U.S. Cl.
CPC .......... *H04L 1/1861* (2013.01); *H04L 1/1864* (2013.01); *H04L 5/0053* (2013.01);
(Continued)

(58) Field of Classification Search
CPC ....... H04L 5/0055; H04L 5/14; H04L 1/1861; H04L 1/1812; H04W 72/042
See application file for complete search history.

(56) References Cited

U.S. PATENT DOCUMENTS

2011/0070845 A1    3/2011    Chen et al.
2012/0257552 A1   10/2012    Chen et al.
(Continued)

FOREIGN PATENT DOCUMENTS

CN    102223728 A    10/2011
CN    103138885 A     6/2013
(Continued)

OTHER PUBLICATIONS

Samsung, "Specification Support for FDD-TDD CA," 3GPP TSG RAN WG1 #74bis, R1-134168, Oct. 7-11, 2013, Guangzhou, China, pp. 1-4.
(Continued)

*Primary Examiner* — Jung H Park
(74) *Attorney, Agent, or Firm* — Slater Matsil, LLP

(57) ABSTRACT

Embodiments relate to a control information transmission method, user equipment, and a base station. The control information transmission method includes: determining, by user equipment, a downlink control information (DCI) format of a downlink control channel corresponding to a first serving cell, where the first serving cell is a serving cell corresponding to the user equipment, and the DCI format is determined using a duplex mode of the first serving cell and a feedback manner of a hybrid automatic repeat request-acknowledgment (HARQ-ACK) corresponding to the first serving cell; and detecting, by the user equipment, the downlink control channel according to the determined DCI format.

18 Claims, 5 Drawing Sheets

---

A base station determines, according to a duplex mode of a first serving cell of user equipment and a feedback manner of an HARQ-ACK corresponding to the first serving cell, a DCI format of a downlink control channel corresponding to the first serving cell — 201

The base station sends higher layer signaling to the user equipment, where the higher layer signaling includes indication information indicating the determined DCI format — 202

The user equipment detects the downlink control channel according to the determined DCI format — 203

Related U.S. Application Data continuation of application No. PCT/CN2013/084757, filed on Sep. 30, 2013.

(51) Int. Cl.
*H04L 5/14* (2006.01)
*H04W 72/04* (2009.01)
*H04W 28/06* (2009.01)
*H04W 48/16* (2009.01)

(52) U.S. Cl.
CPC .............. *H04L 5/14* (2013.01); *H04W 72/042* (2013.01); *H04W 72/0413* (2013.01); *H04L 1/1854* (2013.01); *H04W 28/06* (2013.01); *H04W 48/16* (2013.01)

(56) References Cited

U.S. PATENT DOCUMENTS

| | | | |
|---|---|---|---|
| 2014/0293893 A1* | 10/2014 | Papasakellariou | H04W 72/04 370/329 |
| 2014/0301324 A1 | 10/2014 | Cheng et al. | |
| 2015/0245344 A1* | 8/2015 | You | H04J 11/00 370/280 |
| 2017/0257191 A1* | 9/2017 | Seo | H04W 74/002 |

FOREIGN PATENT DOCUMENTS

| | | |
|---|---|---|
| CN | 103178926 A | 6/2013 |
| JP | 2013504942 A | 2/2013 |
| JP | 2016514916 A | 5/2016 |
| WO | 2012142123 A2 | 10/2012 |
| WO | 2013022272 A2 | 2/2013 |
| WO | 2013025677 A2 | 2/2013 |
| WO | 2013046619 A1 | 4/2013 |

OTHER PUBLICATIONS

3rd Generation Partnership Project; Technical Specification Group Radio Access Network; Study on LTE TDD-FDD joint operation including Carrier Aggregation (Release 12), 3GPP TR 36.847, V1.0.0, 20 (Sep. 2013), 13 pages.
CMCC, "Text proposal for FDD and TDD joint operation," 7.2.6, 3GPP TSG-RAN WG1 #74, R1-134020, Aug. 19-23, 2013, 4 pages.
Huawei et al., "Details of TDD-FDD CA," 7.2.3.1, 3GPP TSG-RAN WG1 #74bis, R1-134056, Oct. 7-11, 2013, 5 pages.
3GPP TS 36.211, "3rd Generation Partnership Project; Technical Specification Group Radio Access Network; Evolved Universal Terrestrial Radio Access (E-UTRA); Physical channels and modulation (Release 11)", Sep. 2013, 120 pages, V11.4.0, Valbonne, France.

\* cited by examiner

CONTROL INFORMATION TRANSMISSION METHOD, USER EQUIPMENT, AND BASE STATION

CROSS-REFERENCE TO RELATED APPLICATIONS

This application is a continuation of U.S. patent application Ser. No. 15/084,122, filed on Mar. 29, 2016, issued as U.S. Pat. No. 9,998,259, which is a continuation of International Application No. PCT/CN2013/084757, filed on Sep. 30, 2013, which applications are hereby incorporated by reference in their entireties.

TECHNICAL FIELD

The present invention relates to the field of communications technologies, and in particular, to a control information transmission method, user equipment, and a base station.

BACKGROUND

A 3rd Generation Partnership Project (3GPP) Long Term Evolution (LTE) system includes two modes: frequency division duplex (FDD) and time division duplex (TDD). In an FDD system, sending and receiving are performed on two separate frequency channels. In a TDD system, sending and receiving are performed on one frequency channel, but sending and receiving are temporally separated, that is, different timeslots of a same frequency carrier are used for sending and receiving. The TDD system supports different uplink-downlink time configurations. An uplink-downlink time configuration may be adjusted according to different service types, so as to meet a requirement of an uplink-downlink asymmetric service.

In the releases 3GPP LTE Rel10/11, a carrier aggregation (CA) technology, also referred to as a spectrum aggregation technology or a bandwidth extension technology, is introduced to meet a peak data rate requirement of International Telecommunication Union on a fourth generation communication technology. During carrier aggregation, spectrums of two or more component carriers are aggregated to obtain wider transmission bandwidth. The spectrums of the component carriers may be adjacent continuous spectrums, or may be non-adjacent spectrums in a same frequency band or even discontinuous spectrums in different frequency bands. LTE Rel-8/9 user equipment (UE) can access only one component carrier to send and receive data, while LTE-A user equipment can access, according to its capability and a service requirement, multiple component carriers at the same time to send and receive data.

In an existing carrier aggregation system, aggregation is performed on carriers corresponding to a same evolved NodeB (eNB), or aggregation is performed on carriers of a macro cell and a micro cell between which an ideal backhaul link (Backhaul) exists, for example, the macro cell and the micro cell are connected using an optical fiber (in this case, the micro cell may also be a radio-frequency head). In an existing CA system, hybrid automatic repeat request-acknowledgement information is sent only over a primary component carrier. In the existing CA system, duplex modes of aggregated carriers are the same, for example, may be FDD or may be TDD. In the existing CA system, if a duplex mode of a carrier is FDD, content of a DCI format of a downlink control channel corresponding to the carrier is determined in FDD mode; if a duplex mode of a carrier is TDD, content of a DCI format of a downlink control channel corresponding to the carrier is determined in TDD mode.

In a subsequent LTE system, carrier aggregation may evolve into aggregation in different duplex modes and/or aggregation between base stations. For manners of aggregation in different duplex modes and/or aggregation between base stations, a problem of transmission of control information such as downlink control information and uplink control information needs to be resolved.

In view of this, a technical problem to be resolved in the present invention is how to transmit control information in different aggregation manners.

SUMMARY

To resolve the foregoing technical problem, according to an embodiment of the present invention, a control information transmission method is provided. The method includes determining, by user equipment, a downlink control information (DCI) format of a downlink control channel corresponding to a first serving cell, where the first serving cell is a serving cell corresponding to the user equipment, and the DCI format is determined by using a duplex mode of the first serving cell and a feedback manner of a hybrid automatic repeat request-acknowledgment HARQ-ACK corresponding to the first serving cell. The method also includes detecting, by the user equipment, the downlink control channel according to the determined DCI format.

For the foregoing control information transmission method, in a possible implementation manner, the determining, by user equipment, a DCI format of a downlink control channel corresponding to a first serving cell includes: determining, by the user equipment according to the duplex mode of the first serving cell and the feedback manner of the HARQ-ACK corresponding to the first serving cell, the DCI format of the downlink control channel corresponding to the first serving cell.

For the foregoing control information transmission method, in a possible implementation manner, the determining, by the user equipment according to the duplex mode of the first serving cell and the feedback manner of the HARQ-ACK corresponding to the first serving cell, the DCI format of the downlink control channel corresponding to the first serving cell includes: if the duplex mode of the first serving cell is frequency division duplex FDD, a duplex mode of a second serving cell of the user equipment is time division duplex TDD, and the HARQ-ACK corresponding to the first serving cell is transmitted over a physical uplink control channel PUCCH that is carried by the second serving cell, determining, by the user equipment, the DCI format of the downlink control channel corresponding to the first serving cell as a DCI format corresponding to the TDD; or if the duplex mode of the first serving cell is FDD, and the HARQ-ACK corresponding to the first serving cell is fed back in some uplink subframes of a radio frame, determining, by the user equipment, the DCI format of the downlink control channel corresponding to the first serving cell as a DCI format corresponding to TDD; or if the duplex mode of the first serving cell is FDD: in a case in which the user equipment has multiple uplink transmission capabilities in one subframe, determining, by the user equipment, the DCI format of the downlink control channel corresponding to the first serving cell as a DCI format corresponding to the FDD; and in a case in which the user equipment has a single uplink transmission capability in one subframe, determining, by the user equipment, the DCI format of the downlink control channel corresponding to the first serving cell as a DCI format corresponding to TDD; or if the duplex mode of the first serving cell is TDD, a duplex mode of a second serving cell of the user equipment is FDD, and the HARQ-ACK corresponding to the first serving cell is transmitted over a PUCCH that is carried by the second serving cell, determining, by the user equipment, the DCI format of the downlink control channel corresponding to the first serving cell as a DCI format corresponding to the FDD.

For the foregoing control information transmission method, in a possible implementation manner, the detecting, by the user equipment, the downlink control channel according to the determined DCI format includes: when the duplex mode of the first serving cell is the FDD, and the determined DCI format is the DCI format corresponding to the TDD, detecting, by the user equipment, the downlink control channel according to the DCI format corresponding to the TDD; and the user equipment does not expect that a DCI format of the downlink control channel that is detected in common search space CSS corresponding to the first serving cell is DCI format 1A, or that a cyclic redundancy check CRC of the detected downlink control channel is scrambled by using a cell radio network temporary identifier C-RNTI.

To resolve the foregoing technical problem, according to an embodiment of the present invention, a control information transmission method is provided. The method includes determining, by a base station according to a duplex mode of a first serving cell of user equipment and a feedback manner of an HARQ-ACK corresponding to the first serving cell, a DCI format of a downlink control channel corresponding to the first serving cell, where the first serving cell is a serving cell corresponding to the user equipment. The method also includes sending, by the base station, the downlink control channel according to the determined DCI format.

For the foregoing control information transmission method, in a possible implementation manner, after the base station determines the DCI format of the downlink control channel corresponding to the first serving cell of the user equipment, and before the base station sends the downlink control channel according to the determined DCI format, the method includes: sending, by the base station, higher layer signaling to the user equipment, where the higher layer signaling includes indication information indicating the determined DCI format.

For the foregoing control information transmission method, in a possible implementation manner, the determining, by a base station according to a duplex mode of a first serving cell of the user equipment and a feedback manner of an HARQ-ACK corresponding to the first serving cell, a DCI format of a downlink control channel corresponding to the first serving cell includes: if the duplex mode of the first serving cell is FDD, a duplex mode of a second serving cell of the user equipment is TDD, and the HARQ-ACK corresponding to the first serving cell is transmitted over a physical uplink control channel PUCCH that is carried by the second serving cell, determining, by the base station, the DCI format of the downlink control channel corresponding to the first serving cell as a DCI format corresponding to the TDD; or if the duplex mode of the first serving cell is FDD, and the HARQ-ACK corresponding to the first serving cell is fed back in some uplink subframes of a radio frame, determining, by the base station, the DCI format of the downlink control channel corresponding to the first serving cell as a DCI format corresponding to TDD; or if the duplex mode of the first serving cell is FDD: in a case in which the user equipment has multiple uplink transmission capabilities in one subframe, determining, by the base station, the DCI format of the downlink control channel corresponding to the first serving cell as a DCI format corresponding to the FDD; and in a case in which the user equipment has a single uplink transmission capability in one subframe, determining, by the base station, the DCI format of the downlink control channel corresponding to the first serving cell as a DCI format corresponding to TDD; or if the duplex mode of the first serving cell is TDD, a duplex mode of a second serving cell of the user equipment is FDD, and the HARQ-ACK corresponding to the first serving cell is transmitted over a PUCCH that is carried by the second serving cell, determining, by the base station, the DCI format of the downlink control channel corresponding to the first serving cell as a DCI format corresponding to the FDD.

For the foregoing control information transmission method, in a possible implementation manner, the sending, by the base station, the downlink control channel according to the determined DCI format includes: if the duplex mode of the first serving cell is the FDD, and the determined DCI format is the DCI format corresponding to the TDD, sending, by the base station, the downlink control channel according to the DCI format corresponding to the TDD; and when the DCI format of the downlink control channel is DCI format 1A, and a CRC of the downlink control channel is scrambled by using a C-RNTI, the downlink control channel is carried by UE-specific search space USS corresponding to the first serving cell.

To resolve the foregoing technical problem, according to an embodiment of the present invention, a control information transmission method is provided. The method includes receiving, by user equipment, higher layer signaling from a base station, where the higher layer signaling includes indication information indicating a DCI format of a downlink control channel corresponding to a first serving cell of the user equipment, and the DCI format is determined by the base station according to a duplex mode of the first serving cell and a feedback manner of an HARQ-ACK corresponding to the first serving cell. The method also includes detecting, by the user equipment, the downlink control channel according to the determined DCI format.

For the foregoing control information transmission method, in a possible implementation manner, the detecting, by the user equipment, the downlink control channel according to the determined DCI format includes: when the duplex mode of the first serving cell is FDD, and the determined DCI format is a DCI format corresponding to TDD, detecting, by the user equipment, the downlink control channel according to the DCI format corresponding to the TDD; and the user equipment does not expect that a DCI format of the downlink control channel that is detected in CSS corresponding to the first serving cell is DCI format 1A, or that a CRC of the detected downlink control channel is scrambled by using a C-RNTI.

To resolve the foregoing technical problem, according to an embodiment of the present invention, user equipment is provided. The user equipment includes a determining module, configured to determine a downlink control information DCI format of a downlink control channel corresponding to a first serving cell, where the first serving cell is a serving cell corresponding to the user equipment, and the DCI format is determined by using a duplex mode of the first serving cell and a feedback manner of a hybrid automatic repeat request-acknowledgment HARQ-ACK corresponding to the first serving cell. The user equipment also includes a detection module, configured to detect the downlink control channel according to the determined DCI format.

For the foregoing user equipment, in a possible implementation manner, the determining module is configured to determine, according to the duplex mode of the first serving cell and the feedback manner of the HARQ-ACK corresponding to the first serving cell, the DCI format of the downlink control channel corresponding to the first serving cell.

For the foregoing user equipment, in a possible implementation manner, the determining module includes any one or more of the following units: a first determining unit, configured to: if the duplex mode of the first serving cell is frequency division duplex FDD, a duplex mode of a second serving cell of the user equipment is time division duplex TDD, and the HARQ-ACK corresponding to the first serving cell is transmitted over a physical uplink control channel PUCCH that is carried by the second serving cell, determine the DCI format of the downlink control channel corresponding to the first serving cell as a DCI format corresponding to the TDD; a second determining unit, configured to: if the duplex mode of the first serving cell is FDD, and the HARQ-ACK corresponding to the first serving cell is fed back in some uplink subframes of a radio frame, determine the DCI format of the downlink control channel corresponding to the first serving cell as a DCI format corresponding to TDD; a third determining unit, configured to: if the duplex mode of the first serving cell is FDD: in a case in which the user equipment has multiple uplink transmission capabilities in one subframe, determine the DCI format of the downlink control channel corresponding to the first serving cell as a DCI format corresponding to the FDD; and in a case in which the user equipment has a single uplink transmission capability in one subframe, determine the DCI format of the downlink control channel corresponding to the first serving cell as a DCI format corresponding to TDD; and a fourth determining unit, configured to: if the duplex mode of the first serving cell is TDD, a duplex mode of a second serving cell of the user equipment is FDD, and the HARQ-ACK corresponding to the first serving cell is transmitted over a PUCCH that is carried by the second serving cell, determine the DCI format of the downlink control channel corresponding to the first serving cell as a DCI format corresponding to the FDD.

For the foregoing user equipment, in a possible implementation manner, the detection module is configured to: when the duplex mode of the first serving cell is the FDD, and the determined DCI format is the DCI format corresponding to the TDD, detect the downlink control channel according to the DCI format corresponding to the TDD; and it is not expected that a DCI format of the downlink control channel that is detected in common search space CSS corresponding to the first serving cell is DCI format 1A, or that a cyclic redundancy check CRC of the detected downlink control channel is scrambled by using a cell radio network temporary identifier C-RNTI.

To resolve the foregoing technical problem, according to an embodiment of the present invention, a base station is provided. The base station includes a determining module, configured to determine, according to a duplex mode of a first serving cell of user equipment and a feedback manner of an HARQ-ACK corresponding to the first serving cell, a DCI format of a downlink control channel corresponding to the first serving cell, where the first serving cell is a serving cell corresponding to the user equipment. The base station also includes a sending module, configured to send the downlink control channel according to the determined DCI format.

For the foregoing base station, in a possible implementation manner, the sending module is further configured to send higher layer signaling to the user equipment after the determining module determines the DCI format of the downlink control channel corresponding to the first serving cell of the user equipment, and before the sending module sends the downlink control channel according to the determined DCI format, where the higher layer signaling includes indication information indicating the determined DCI format.

For the foregoing base station, in a possible implementation manner, the determining module includes: a first determining unit, configured to: if the duplex mode of the first serving cell is FDD, a duplex mode of a second serving cell of the user equipment is TDD, and the HARQ-ACK corresponding to the first serving cell is transmitted over a physical uplink control channel PUCCH that is carried by the second serving cell, determine the DCI format of the downlink control channel corresponding to the first serving cell as a DCI format corresponding to the TDD; or a second determining unit, configured to: if the duplex mode of the first serving cell is FDD, and the HARQ-ACK corresponding to the first serving cell is fed back in some uplink subframes of a radio frame, determine the DCI format of the downlink control channel corresponding to the first serving cell as a DCI format corresponding to TDD; or a third determining unit, configured to: if the duplex mode of the first serving cell is FDD: in a case in which the user equipment has multiple uplink transmission capabilities in one subframe, determine the DCI format of the downlink control channel corresponding to the first serving cell as a DCI format corresponding to the FDD; and in a case in which the user equipment has a single uplink transmission capability in one subframe, determine, the DCI format of the downlink control channel corresponding to the first serving cell as a DCI format corresponding to TDD; or a fourth determining unit, configured to: if the duplex mode of the first serving cell is TDD, a duplex mode of a second serving cell of the user equipment is FDD, and the HARQ-ACK corresponding to the first serving cell is transmitted over a PUCCH that is carried by the second serving cell, determine the DCI format of the downlink control channel corresponding to the first serving cell as a DCI format corresponding to the FDD.

For the foregoing base station, in a possible implementation manner, the sending module is configured to: if the duplex mode of the first serving cell is the FDD, and the determined DCI format is the DCI format corresponding to the TDD, send the downlink control channel according to the DCI format corresponding to the TDD; and when the DCI format of the downlink control channel is DCI format 1A, and a CRC of the downlink control channel is scrambled by using a C-RNTI, the downlink control channel is carried by UE-specific search space USS corresponding to the first serving cell.

To resolve the foregoing technical problem, according to an embodiment of the present invention, user equipment is provided. The user equipment includes a receiving module, configured to receive higher layer signaling from a base station, where the higher layer signaling includes indication information indicating a DCI format of a downlink control channel corresponding to a first serving cell of the user equipment, and the DCI format is determined by the base station according to a duplex mode of the first serving cell and a feedback manner of an HARQ-ACK corresponding to the first serving cell. The user equipment also includes a detection module, configured to detect the downlink control channel according to the determined DCI format.

For the foregoing user equipment, in a possible implementation manner, the detection module is specifically configured to: when the duplex mode of the first serving cell is FDD, and the determined DCI format is a DCI format corresponding to TDD, detect the downlink control channel according to the DCI format corresponding to the TDD; and it is not expected that a DCI format of the downlink control channel that is detected in CSS corresponding to the first serving cell is DCI format 1A, or that a CRC of the detected downlink control channel is scrambled by using a C-RNTI.

To resolve the foregoing technical problem, according to an embodiment of the present invention, a control information transmission method is provided. The method includes receiving, by user equipment, physical uplink control channel configuration information. The method also includes determining, by the user equipment according to the physical uplink control channel configuration information, a serving cell that carries a first physical uplink control channel. The method also includes sending, by the user equipment, uplink control information by using the first physical uplink control channel in the serving cell that carries the first physical uplink control channel.

For the foregoing control information transmission method, in a possible implementation manner, the uplink control channel configuration information includes a cell index of the serving cell that carries the first physical uplink control channel, and the determining, by the user equipment according to the physical uplink control channel configuration information, a serving cell that carries a first physical uplink control channel includes: determining, by the user equipment according to the cell index that is in the physical uplink control channel configuration information and that is of the serving cell carrying the first uplink control channel, the serving cell that carries the first physical uplink control channel.

For the foregoing control information transmission method, in a possible implementation manner, the serving cell that carries the first physical uplink control channel is a secondary serving cell of the user equipment.

For the foregoing control information transmission method, in a possible implementation manner, the sending, by the user equipment, uplink control information by using the first physical uplink control channel in the serving cell that carries the first physical uplink control channel includes: sending, by the user equipment, first uplink control information by using the first physical uplink control channel in the serving cell that carries the first physical uplink control channel; and sending, by the user equipment, second uplink control information by using a second physical uplink control channel in a primary serving cell of the user equipment.

For the foregoing control information transmission method, in a possible implementation manner, the determining, by the user equipment according to the physical uplink control channel configuration information, a serving cell that carries a first physical uplink control channel includes: determining, by the user equipment according to the physical uplink control channel configuration information, the serving cell that carries the first physical uplink control channel and a serving cell that carries a second physical uplink control channel; and the sending, by the user equipment, uplink control information by using the first physical uplink control channel in the serving cell that carries the first physical uplink control channel includes: sending, by the user equipment, first uplink control information by using the first physical uplink control channel in the serving cell that carries the first physical uplink control channel; and sending second uplink control information in the serving cell that carries the second physical uplink control channel.

For the foregoing control information transmission method, in a possible implementation manner, the uplink control channel configuration information includes a cell index of the serving cell that carries the first physical uplink control channel and a cell index of the serving cell that carries the second physical uplink control channel, and the determining, by the user equipment according to the physical uplink control channel configuration information, the serving cell that carries the first physical uplink control channel and a serving cell that carries a second physical uplink control channel includes: determining, by the user equipment according to the cell index that is in the physical uplink control channel configuration information and that is of the serving cell carrying the first physical uplink control channel, the serving cell that carries the first physical uplink control channel; and determining, according to the cell index that is in the physical uplink control channel configuration information and that is of the serving cell carrying the second physical uplink control channel, the serving cell that carries the second physical uplink control channel.

For the foregoing control information transmission method, in a possible implementation manner, the first uplink control information is corresponding to a first serving cell set, the second uplink control information is corresponding to a second serving cell set, and the first serving cell set includes at least one serving cell that does not belong to the second serving cell set.

For the foregoing control information transmission method, in a possible implementation manner, including: a duplex mode of a serving cell in the first serving cell set is frequency division duplex (FDD), and a duplex mode of a serving cell in the second serving cell set is time division duplex (TDD); or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link.

For the foregoing control information transmission method, in a possible implementation manner, including: a serving cell included in the first serving cell set and a serving cell included in the second physical cell set are determined according to the physical uplink control channel configuration information.

For the foregoing control information transmission method, in a possible implementation manner, the physical uplink control channel configuration information includes a cell index of a serving cell that is in the first serving cell set and that is corresponding to the first physical uplink control channel and a cell index of a serving cell that is in the second serving cell set and that is corresponding to the second physical uplink control channel, and that a serving cell included in the first serving cell set and a serving cell included in the second physical cell set are determined according to the physical uplink control channel configuration information includes: the serving cell included in the first serving cell set is determined according to the cell index, in the physical uplink control channel configuration information, of the serving cell that is in the first serving cell set and that is corresponding to the first physical uplink control channel; and the serving cell included in the second serving cell set is determined according to the cell index, in the physical uplink control channel configuration information, of the serving cell that is in the second serving cell set and that is corresponding to the second physical uplink control channel.

To resolve the foregoing technical problem, according to an embodiment of the present invention, a control information transmission method is provided, The method includes sending, by a base station, physical uplink control channel configuration information to user equipment, where the physical uplink control channel configuration information includes indication information indicating a serving cell that carries a first physical uplink control channel, and the serving cell is a serving cell corresponding to the user equipment. The method also includes receiving, by the base station by using the first physical uplink control channel in the serving cell that carries the first physical uplink control channel, uplink control information sent by the user equipment.

For the foregoing control information transmission method, in a possible implementation manner, the indication information indicating the serving cell that carries the first physical uplink control channel is a cell index of the serving cell that carries the first physical uplink control channel.

For the foregoing control information transmission method, in a possible implementation manner, the serving cell that carries the first physical uplink control channel is a secondary serving cell of the user equipment.

For the foregoing control information transmission method, in a possible implementation manner, the receiving, by the base station by using the first physical uplink control channel in the serving cell that carries the first physical uplink control channel, uplink control information sent by the user equipment includes: receiving, by the base station by using the first physical uplink control channel in the serving cell that carries the first physical uplink control channel, first uplink control information sent by the user equipment; and receiving, by using a second physical uplink control channel in a primary serving cell of the user equipment, second uplink control information sent by the user equipment.

For the foregoing control information transmission method, in a possible implementation manner, that the physical uplink control channel configuration information includes indication information indicating a serving cell that carries a first physical uplink control channel, and the serving cell that carries the first physical uplink control channel is a serving cell corresponding to the user equipment includes: the physical uplink control channel configuration information includes the indication information indicating the serving cell that carries the first physical uplink control channel and indication information indicating a serving cell that carries a second physical uplink control channel, and both the serving cell that carries the first physical uplink control channel and the serving cell that carries the second physical uplink control channel are serving cells corresponding to the user equipment; and the receiving, by the base station by using the first physical uplink control channel in the serving cell that carries the first physical uplink control channel, uplink control information sent by the user equipment includes: receiving, by the base station by using the first physical uplink control channel in the serving cell that carries the first physical uplink control channel, first uplink control information sent by the user equipment; and receiving, by using the second physical uplink control channel in the serving cell that carries the second physical uplink control channel, second uplink control information sent by the user equipment.

For the foregoing control information transmission method, in a possible implementation manner, the indication information indicating the serving cell that carries the first physical uplink control channel is a cell index of the serving cell that carries the first physical uplink control channel, and the indication information indicating the serving cell that carries the second physical uplink control channel is a cell index of the serving cell that carries the second physical uplink control channel.

For the foregoing control information transmission method, in a possible implementation manner, the first uplink control information is corresponding to a first serving cell set of the user equipment, the second uplink control information is corresponding to a second serving cell set of the user equipment, and the first serving cell set includes at least one serving cell that does not belong to the second serving cell set.

For the foregoing control information transmission method, in a possible implementation manner: a duplex mode of a serving cell in the first serving cell set is frequency division duplex FDD, and a duplex mode of a serving cell in the second serving cell set is time division duplex TDD; or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link.

For the foregoing control information transmission method, in a possible implementation manner, the physical uplink control channel configuration information includes a cell index of a serving cell that is in the first serving cell set and that corresponds to the first physical uplink control channel and a cell index of a serving cell that is in the second serving cell set and that is corresponding to the second physical uplink control channel.

To resolve the foregoing technical problem, according to an embodiment of the present invention, user equipment is provided. The user equipment includes a receiving module, configured to receive physical uplink control channel configuration information. The user equipment also includes a determining module, configured to determine, according to the physical uplink control channel configuration information, a serving cell that carries a first physical uplink control channel. The user equipment also includes a sending module, configured to send uplink control information by using the first physical uplink control channel in the serving cell that carries the first physical uplink control channel.

For the foregoing user equipment, in a possible implementation manner, the uplink control channel configuration information includes a cell index of the serving cell that carries the first physical uplink control channel; and the determining module is specifically configured to determine, according to the cell index that is in the physical uplink control channel configuration information and that is of the serving cell carrying the first uplink control channel, the serving cell that carries the first physical uplink control channel.

For the foregoing user equipment, in a possible implementation manner, the serving cell that carries the first physical uplink control channel is a secondary serving cell of the user equipment.

For the foregoing user equipment, in a possible implementation manner, the sending module is configured to: send first uplink control information by using the first physical uplink control channel in the serving cell that carries the first physical uplink control channel; and send second uplink control information by using a second physical uplink control channel in a primary serving cell of the user equipment.

For the foregoing user equipment, in a possible implementation manner, the determining module is configured to: determine, according to the physical uplink control channel configuration information, the serving cell that carries the first physical uplink control channel and a serving cell that carries a second physical uplink control channel; and the sending module is configured to: send first uplink control information by using the first physical uplink control channel in the serving cell that carries the first physical uplink control channel; and send second uplink control information in the serving cell that carries the second physical uplink control channel.

For the foregoing user equipment, in a possible implementation manner, the physical uplink control channel configuration information includes a cell index of the serving cell that carries the first physical uplink control channel and a cell index of the serving cell that carries the second physical uplink control channel; and the determining module includes: a first determining unit, configured to determine, according to the cell index that is in the physical uplink control channel configuration information and that is of the serving cell carrying the first physical uplink control channel, the serving cell that carries the first physical uplink control channel; and a second determining unit, configured to determine, according to the cell index that is in the physical uplink control channel configuration information and that is of the serving cell carrying the second physical uplink control channel, the serving cell that carries the second physical uplink control channel.

For the foregoing user equipment, in a possible implementation manner, the first uplink control information is corresponding to a first serving cell set, the second uplink control information is corresponding to a second serving cell set, and the first serving cell set includes at least one serving cell that does not belong to the second serving cell set.

For the foregoing user equipment, in a possible implementation manner, a duplex mode of a serving cell in the first serving cell set is frequency division duplex FDD, and a duplex mode of a serving cell in the second serving cell set is time division duplex TDD; or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link.

For the foregoing user equipment, in a possible implementation manner, the determining module is further configured to determine, according to the physical uplink control channel configuration information, a serving cell included in the first serving cell set and a serving cell included in the second physical cell set.

For the foregoing user equipment, in a possible implementation manner, the physical uplink control channel configuration information includes a cell index of a serving cell that is in the first serving cell set and that is corresponding to the first physical uplink control channel and a cell index of a serving cell that is in the second serving cell set and that is corresponding to the second physical uplink control channel; and the determining module further includes: a third determining unit, configured to determine the serving cell included in the first serving cell set according to the cell index, in the physical uplink control channel configuration information, of the serving cell that is in the first serving cell set and that is corresponding to the first physical uplink control channel; and a fourth determining unit, configured to determine the serving cell included in the second serving cell set according to the cell index, in the physical uplink control channel configuration information, of the serving cell that is in the second serving cell set and that is corresponding to the second physical uplink control channel.

To resolve the foregoing technical problem, according to an embodiment of the present invention, a base station is provided. The base station includes a sending module, configured to send physical uplink control channel configuration information to user equipment, where the physical uplink control channel configuration information includes indication information indicating a serving cell that carries a first physical uplink control channel, and the serving cell is a serving cell corresponding to the user equipment. The base station also includes a receiving module, configured to receive, by using the first physical uplink control channel in the serving cell that carries the first physical uplink control channel, uplink control information sent by the user equipment.

For the foregoing base station, in a possible implementation manner, the indication information indicating the serving cell that carries the first physical uplink control channel is a cell index of the serving cell that carries the first physical uplink control channel.

For the foregoing base station, in a possible implementation manner, the serving cell that carries the first physical uplink control channel is a secondary serving cell of the user equipment.

For the foregoing base station, in a possible implementation manner, the receiving module is configured to: receive, using the first physical uplink control channel in the serving cell that carries the first physical uplink control channel, first uplink control information sent by the user equipment; and receive, by using a second physical uplink control channel in a primary serving cell of the user equipment, second uplink control information sent by the user equipment.

For the foregoing base station, in a possible implementation manner, that the physical uplink control channel configuration information includes indication information indicating a serving cell that carries a first physical uplink control channel, and the serving cell that carries the first physical uplink control channel is a serving cell corresponding to the user equipment includes: the physical uplink control channel configuration information includes the indication information indicating the serving cell that carries the first physical uplink control channel and indication information indicating a serving cell that carries a second physical uplink control channel, and both the serving cell that carries the first physical uplink control channel and the serving cell that carries the second physical uplink control channel are serving cells corresponding to the user equipment; and the receiving module is specifically configured to: receive, by using the first physical uplink control channel in the serving cell that carries the first physical uplink control channel, first uplink control information sent by the user equipment; and receive, by using the second physical uplink control channel in the serving cell that carries the second physical uplink control channel, second uplink control information sent by the user equipment.

For the foregoing base station, in a possible implementation manner, the indication information indicating the serving cell that carries the first physical uplink control channel is a cell index of the serving cell that carries the first physical uplink control channel, and the indication information indicating the serving cell that carries the second physical uplink control channel is a cell index of the serving cell that carries the second physical uplink control channel.

For the foregoing base station, in a possible implementation manner, the first uplink control information is corresponding to a first serving cell set of the user equipment, the second uplink control information is corresponding to a second serving cell set of the user equipment, and the first serving cell set includes at least one serving cell that does not belong to the second serving cell set.

For the foregoing base station, in a possible implementation manner, a duplex mode of a serving cell in the first serving cell set is frequency division duplex FDD, and a duplex mode of a serving cell in the second serving cell set is time division duplex TDD; or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link.

For the foregoing base station, in a possible implementation manner, the physical uplink control channel configuration information includes a cell index of a serving cell that is in the first serving cell set and that is corresponding to the first physical uplink control channel and a cell index of a serving cell that is in the second serving cell set and that is corresponding to the second physical uplink control channel.

In the embodiments of the present invention, when different carrier aggregation manners are used, a DCI format corresponding to a control channel may be determined according to a duplex mode and an HARQ-ACK feedback manner, and therefore the present invention can be flexibly applied to various scenarios.

Exemplary embodiments are described in detail with reference to accompanying drawings to clarify other features and aspects of the present invention.

BRIEF DESCRIPTION OF THE DRAWINGS

Accompanying drawings included in the specification and constituting a part of the specification and the specification illustrate exemplary embodiments, features, and aspects of the present invention, and are used for explaining principles of the present invention.

DETAILED DESCRIPTION OF ILLUSTRATIVE EMBODIMENTS

Figure 1:
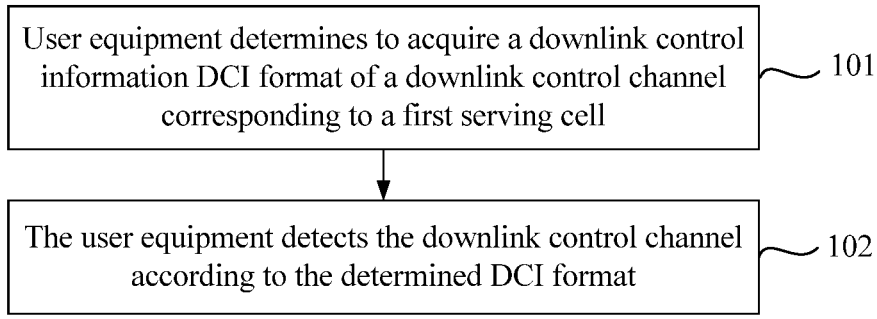
FIG. 1 shows a flowchart of a control information transmission method according to an embodiment of the present invention.

The following describes various exemplary embodiments, features, and aspects of the present invention in detail with reference to accompanying drawings. Same reference numerals in the accompanying drawings designate elements that have same or similar functions. Various aspects of the embodiments illustrated in the accompanying drawings may not be necessarily drawn to scale, unless otherwise specified.

The word "exemplary" specially used herein indicates "used as an example or embodiment, or illustrative". Any embodiment that is described as an exemplary embodiment should not be construed to be preferred over or better than another embodiment.

In addition, numerous specific details are set forth in the following specific embodiments in order to better describe the present invention. However, a person skilled in the art should understand that the present invention may be practiced without some specific details. In some other instances, methods, means, elements, and circuits well known to a person skilled in the art are not described in detail so as to highlight the subject matter of the present invention.

In a 3GPP LTE Rel-8/9/10/11 TDD system, when an uplink-downlink subframe configuration for a carrier is 1 to 6, an uplink grant (UL grant, corresponding to downlink control information DCI format 0 or downlink control information DCI format 4) corresponding to the carrier includes a downlink assignment index (DAI) field, where a value of the DAI field indicates a total quantity of subframes that are in a downlink associated subframe set corresponding to an uplink subframe n and in which a physical downlink shared channel (PDSCH) is scheduled or a physical downlink control channel (PDCCH) indicating a downlink SPS release is sent. For an uplink grant corresponding to an FDD carrier, the DAI field does not exist in DCI format 0 or DCI format 4.

In the 3GPP LTE Rel-8/9/10/11 TDD system, when an uplink-downlink subframe configuration for a carrier is 1 to 6, downlink control information (DCI) format 1/1A/1B/1D/2/2A/2B/2C/2D corresponding to a downlink control channel corresponding to the carrier includes a DAI field, where a value of the DAI field indicates an accumulative quantity of subframes that are in a downlink associated subframe set corresponding to an uplink subframe n and in which a base station schedules a PDSCH or sends a PDCCH indicating a downlink SPS release. For a downlink control channel corresponding to an FDD carrier, DCI format 1/1A/1B/1D/2/2A/2B/2C/2D corresponding to the downlink control channel does not include a downlink assignment index field.

In the 3GPP LTE Rel-8/9/10/11 TDD system, downlink control information (DCI) format 1/1A/1B/1D/2/2A/2B/2C/2D corresponding to a downlink control channel corresponding to a TDD carrier includes a hybrid automatic repeat request (HARQ) process number indication field corresponding to 4 bits; downlink control information DCI format 1/1A/1B/1D/2/2A/2B/2C/2D corresponding to a downlink control channel corresponding to an FDD carrier includes an HARQ process number indication field corresponding to 3 bits.

In a 3GPP LTE system, in order to support a hybrid automatic repeat request, a terminal needs to feed back a hybrid automatic repeat request-acknowledgment HARQ-ACK to a base station by using a physical uplink control channel (PUCCH) and a physical uplink shared channel (PUSCH), where the hybrid automatic repeat request-acknowledgment may also be simply referred to as an ACK (Acknowledgment)/NACK (Negative Acknowledgement). Therefore, a subsequent LTE system may evolve in the following two aspects:

Evolution 1: Aggregation for different duplex modes, that is, duplex modes of aggregated carriers may be different, for example, duplex modes of some carriers are FDD, and duplex modes of other carriers are TDD. In an existing CA system, an HARQ-ACK is sent only over a primary component carrier. For the aggregation for different duplex modes, the primary component carrier may be an FDD carrier, or may be a TDD carrier. An HARQ-ACK feedback manner in a case in which the primary component carrier is FDD is different from an HARQ-ACK feedback manner in a case in which the primary component carrier is TDD.

Evolution 2: Aggregation between base stations, that is, aggregated carriers are deployed on different base stations, and a backhaul link between the base stations is a non-ideal backhaul link (non-ideal backhaul). In this scenario, duplex modes of the carriers deployed on the different base stations may be the same or may be different. The base station herein may be a macro base station, a micro base station, or the like. For example, when the aggregated carriers come from two different base stations, the scenario may also be referred to as dual connectivity. In this evolution direction, because of the non-ideal backhaul link between the base stations, HARQ-ACKs corresponding to the aggregated carriers that are deployed on the different base stations can be fed back only over an uplink carrier corresponding to each of the HARQ-ACKs, instead of being fed back only over a primary component carrier as in the existing CA system. In this case, if user equipment UE has multiple transmission capabilities in one subframe, an HARQ-ACK can be fed back in a subframe by using multiple PUCCHs. If the user equipment UE has only a single uplink transmission capability, that is, in a subframe, the UE can perform transmission only over an uplink carrier corresponding to one cell, the UE needs to work in different cells in a time division duplex manner. Therefore, for each cell, only some subframes of a radio frame are used for uplink transmission. In this case, an HARQ-ACK corresponding to one carrier can be fed back only over some uplink subframes.

In the foregoing two evolution directions, for different scenarios and users with different capabilities, HARQ-ACK feedback mechanisms may be different. In an LTE Release R8/9/10/11 system, a DCI format corresponding to FDD and a DCI format corresponding to TDD may be different in content and size for a main reason that an HARQ-ACK feedback manner corresponding to the FDD is different from an HARQ-ACK feedback manner corresponding to the TDD. However, generally, after a duplex mode of a carrier is determined, a DCI format corresponding to the carrier is also corresponding to the duplex mode, and requirements in different application scenarios cannot be met in a TDD and FDD joint application scenario. Therefore, in the embodiments of the present invention, a DCI format may be determined according to both a duplex mode and an HARQ-ACK feedback manner, so as to meet requirements in different application scenarios.

Embodiment 1

FIG. 1 shows a flowchart of a control information transmission method according to an embodiment of the present invention. As shown in FIG. 1, the control information transmission method may include the following steps.

Step 101: User equipment determines a downlink control information (DCI) format of a downlink control channel corresponding to a first serving cell, where the first serving cell is a serving cell corresponding to the user equipment, and the DCI format is determined by using a duplex mode of the first serving cell and a feedback manner of a hybrid automatic repeat request-acknowledgment HARQ-ACK corresponding to the first serving cell.

In this embodiment of the present invention, the serving cell corresponding to the user equipment may refer to a serving cell that is configured for the user equipment by a network side device (for example, a base station), or a serving cell that serves the user equipment, or a serving cell accessed by the user equipment. The serving cell corresponding to the user equipment may include the first serving cell and a second serving cell. It should be noted that the serving cell corresponding to the user equipment may also refer to a component carrier of the user equipment, the first serving cell may also be referred to as a first component carrier, and the second serving cell may also be referred to as a second component carrier.

The downlink control channel in this embodiment of the present invention may refer to a physical downlink control channel (PDCCH) or an enhanced physical downlink control channel (EPDCCH). The downlink control channel corresponding to the first serving cell may be a downlink control channel that is carried by the first serving cell and that is corresponding to physical downlink shared channel (PDSCH) transmission, where the downlink control channel corresponding to the PDSCH transmission may be carried by the first serving cell or another serving cell. In addition, the downlink control channel corresponding to the first serving cell may further refer to a downlink control channel that is carried by the first serving cell and that is used to indicate a downlink semi-persistent scheduling (SPS) release.

In this embodiment of the present invention, determining the downlink control information DCI format of the downlink control channel corresponding to the first serving cell may refer to determining whether the downlink control information DCI format of the downlink control channel corresponding to the first serving cell is a DCI format corresponding to FDD or a DCI format corresponding to TDD, where the downlink control information DCI format may refer to one or more of DCI format 1, DCI format 1A, DCI format 1B, DCI format 1D, DCI format 2A, DCI format 2B, DCI format 2C, DCI format 2D, DCI format 0, and DCI format 4. For different duplex modes, different content is carried in each DCI format. The DCI format corresponding to the FDD may refer to that in the DCI format, content carried by the DCI format is determined according to an FDD case; the DCI format corresponding to the TDD may refer to that in the DCI format, content carried by the DCI format is determined according to a TDD case. For example, when an uplink-downlink configuration of a TDD carrier is 1 to 6, DCI format 0 and DCI format 4 corresponding to the TDD include a downlink assignment index (DAI) field, where a value of the DAI field indicates a total quantity of subframes that are in a downlink associated subframe set corresponding to an uplink subframe n and in which a PDSCH is scheduled or a PDCCH indicating a downlink SPS release is sent; while DCI format 0 and DCI format 4 corresponding to the FDD do not include the downlink assignment index DAI field. DCI format 1, DCI format 1A, DCI format 1B, DCI format 1D, DCI format 2A, DCI format 2B, DCI format 2C, and DCI format 2D corresponding to the TDD include a DAI, where a value of the field indicates an accumulative quantity of subframes that are in a downlink associated subframe set corresponding to an uplink subframe n and in which a base station schedules a PDSCH or sends a PDCCH indicating a downlink SPS release; while DCI format 1, DCI format 1A, DCI format 1B, DCI format 1D, DCI format 2A, DCI format 2B, DCI format 2C, and DCI format 2D corresponding to the FDD do not include the DAI. DCI format 1, DCI format 1A, DCI format 1B, DCI format 1D, DCI format 2A, DCI format 2B, DCI format 2C, and DCI format 2D corresponding to the TDD include a 4-bit HARQ process indication field, while DCI format 1, DCI format 1A, DCI format 1B, DCI format 1D, DCI format 2A, DCI format 2B, DCI format 2C, and DCI format 2D corresponding to the FDD include a 3-bit HARQ process indication field.

In this embodiment of the present invention, the downlink control information (DCI) format of the downlink control channel corresponding to the first serving cell is determined, where a cyclic redundancy check (CRC) of the downlink control channel may be scrambled by using a cell radio network temporary identifier (C-RNTI) or a semi-persistent scheduling (SPS) C-RNTI.

In step 101, the user equipment may determine, according to predefined rules that are used in different scenarios to determine a DCI format, the downlink control information DCI format of the downlink control channel corresponding to the first serving cell, which may be specifically: determining, by the user equipment according to the duplex mode of the first serving cell and the feedback manner of the HARQ-ACK corresponding to the first serving cell, the DCI format of the downlink control channel corresponding to the first serving cell.

According to different scenarios, the predefined rules may include any one or more of the following: scenario 1: if the duplex mode of the first serving cell is frequency division duplex FDD, a duplex mode of the second serving cell of the user equipment is time division duplex TDD, and the HARQ-ACK corresponding to the first serving cell is transmitted over a physical uplink control channel PUCCH that is carried by the second serving cell, the user equipment determines the DCI format of the downlink control channel corresponding to the first serving cell as a DCI format corresponding to the TDD; scenario 2: if the duplex mode of the first serving cell is FDD, and the HARQ-ACK corresponding to the first serving cell is fed back in some uplink subframes of a radio frame, the user equipment determines the DCI format of the downlink control channel corresponding to the first serving cell as a DCI format corresponding to TDD; scenario 3: if the duplex mode of the first serving cell is FDD, and the HARQ-ACK corresponding to the first serving cell is transmitted over a PUCCH that is carried by an FDD serving cell, the user equipment determines the DCI format corresponding to the first serving cell as a DCI format corresponding to the FDD; scenario 4: if the duplex mode of the first serving cell is FDD: in a case in which the user equipment has multiple uplink transmission capabilities in one subframe, the user equipment determines the DCI format of the downlink control channel corresponding to the first serving cell as a DCI format corresponding to the FDD; and in a case in which the user equipment has a single uplink transmission capability in one subframe, the user equipment determines the DCI format of the downlink control channel corresponding to the first serving cell as a DCI format corresponding to TDD; scenario 5: if the duplex mode of the first serving cell is TDD, a duplex mode of the second serving cell of the user equipment is FDD, and the HARQ-ACK corresponding to the first serving cell is transmitted over a PUCCH that is carried by the second serving cell, the user equipment determines the DCI format of the downlink control channel corresponding to the first serving cell as a DCI format corresponding to the FDD; and scenario 6: if the duplex mode of the first serving cell is TDD, and the HARQ-ACK corresponding to the first serving cell is transmitted over a PUCCH that is carried by a TDD serving cell, the user equipment determines the DCI format corresponding to the first serving cell as a DCI format corresponding to the TDD.

Step 102: The user equipment detects the downlink control channel according to the determined DCI format.

For example, the user equipment may acquire, according to the determined DCI format, a size of the DCI format, that is, a quantity of bits of information carried by the DCI format; decode the downlink control channel based on the size of the DCI format; and parse decoded content based on an indication field included in the determined DCI format.

Specifically, if in step 101, the duplex mode of the first serving cell is the FDD, and the determined DCI format is the DCI format corresponding to the TDD, in step 102, the user equipment detects the downlink control channel according to the DCI format corresponding to the TDD, and the user equipment does not expect that a DCI format of the downlink control channel that is detected in common search space (CSS) corresponding to the first serving cell is DCI format 1A or DCI format 0, or that a cyclic redundancy check (CRC) of the detected downlink control channel is scrambled by using a C-RNTI. The CSS corresponding to the first serving cell may refer to CSS for the downlink control channel.

In addition, if in step 101, the duplex mode of the first serving cell is the FDD, and the determined DCI format is the DCI format corresponding to the TDD, in step 102, the user equipment detects the downlink control channel according to the DCI format corresponding to the TDD; when the DCI format of the downlink control channel that is detected by the user equipment in the CSS corresponding to the first serving cell is DCI format 1A or DCI format 0, and the CRC of the detected downlink control channel is scrambled by using the C-RNTI, the user equipment discards or ignores information indicated by the downlink control channel, or in other words, the user equipment does not perform PDSCH detection according to an indication of the downlink control channel.

The CSS corresponding to the first serving cell can serve multiple user equipments, and DCI formats in which information is possibly transmitted in the CSS include DCI format 0, DCI format 1A, DCI format 3, DCI format 3A, and DCI format 1C. In order to reduce times of blind detection performed by a user, payloads of DCI format 0 and DCI format 1A are equalized, that is, a padding bit may be added to make the payloads of DCI format 0 and DCI format 1A the same, or in other words, to make quantities of bits of information corresponding to DCI format 0 and DCI format 1 the same. Likewise, payloads of DCI format 3 and DCI format 3A are equalized with the payload of DCI format 0, that is, equalized with the payload of DCI format 1A. DCI format 3 and DCI format 3A are related to multiple users, that is, information carried by DCI format 3 and DCI format 3A needs to be notified to the multiple users, that is, the multiple users need to perform detection on the downlink control channel according to the same payloads of DCI format 3 and DCI format 3A.

In step 102, in some scenarios, the DCI format determined by the user equipment may be not determined according to the duplex mode of the first serving cell. For example, when the duplex mode of the first serving cell in step 101 is the FDD, and the determined DCI format is the DCI format corresponding to the TDD, the DCI format determined by the user equipment is not determined according to the duplex mode FDD of the first serving cell. However, DCI formats determined by different users according to step 101 may be different. For example, a DCI format determined by some users is the DCI format corresponding to the FDD, and a DCI format determined by other users is the DCI format corresponding to the TDD, and in this case, sizes of DCI format 1A determined by different users are inconsistent. Therefore, when detecting DCI format 3 and DCI format 3A, different users may perform detection on a downlink control channel whose DCI format is DCI format 3 or DCI format 3A on an assumption that sizes of DCI format 3 and DCI format 3A are different; consequently, some users cannot correctly detect the downlink control channel whose DCI format is DCI format 3 or DCI format 3A.

Further, step 102 may further include the following.

If in step 101, the duplex mode of the first serving cell is the TDD, and the determined DCI format is the DCI format corresponding to the FDD, in step 102, the user equipment detects the downlink control channel according to the DCI format corresponding to the TDD, and the user equipment does not expect that the DCI format of the downlink control channel that is detected in the CSS corresponding to the first serving cell is DCI format 1A or DCI format 0, or that the CRC of the detected downlink control channel is scrambled by using the C-RNTI. The CSS corresponding to the first serving cell, the common search space, may refer to CSS for the downlink control channel. Alternatively, if in step 101, the duplex mode of the first serving cell is the TDD, and the determined DCI format is the DCI format corresponding to the FDD, in step 102, the user equipment detects the downlink control channel according to the DCI format corresponding to the TDD; when the DCI format of the downlink control channel that is detected by the user equipment in the CSS corresponding to the first serving cell is DCI format 1A or DCI format 0, and the CRC of the detected downlink control channel is scrambled by using the C-RNTI, the user equipment discards or ignores the information indicated by the downlink control channel, or in other words, the user equipment does not perform PDSCH detection according to the indication of the downlink control channel. For advantages, reference may be made to the foregoing related description about that the DCI format of the downlink control channel is not allowed to be DCI format 1A or DCI format 0 when the duplex mode of the first serving cell is the FDD. Details are not described herein again.

According to the control information transmission method in this embodiment, when different carrier aggregation manners are used, user equipment may determine, according to a duplex mode and an HARQ-ACK feedback manner, a DCI format corresponding to a control channel, and therefore the method can be flexibly applied to various scenarios.

In addition, when the duplex mode of the first serving cell is the FDD, the duplex mode of the second serving cell is the TDD, and the HARQ-ACK corresponding to the first serving cell is transmitted over the PUCCH that is carried by the second serving cell (refer to the scenario 1), the DCI format is the DCI format corresponding to the time division duplex TDD. By reusing the DCI format corresponding to the TDD, in one aspect, a new DCI format can be not added; in another aspect, the first serving cell whose duplex mode is the FDD can also obtain a downlink assignment index field, so that the user equipment can perform HARQ-ACK feedback according to the downlink assignment index field. For example, the user equipment performs HARQ-ACK sorting according to the downlink assignment index field, so that an HARQ-ACK bit can receive relatively equal protection during encoding, thereby improving HARQ-ACK transmission performance.

In addition, when the duplex mode of the first serving cell is the TDD, the duplex mode of the second serving cell is the FDD, and the HARQ-ACK corresponding to the first serving cell is transmitted over the PUCCH that is carried by the second serving cell (refer to the scenario 5), the downlink control information DCI format is the DCI format corresponding to the frequency division duplex FDD, so that a redundant indication field such as a DAI field does not need to be transmitted during transmission on downlink control channel. Therefore, a size of the DCI format is reduced, and transmission performance of useful information is improved.

Further, in this embodiment of the present invention, the DCI format of the downlink control channel is not allowed to be DCI format 1A or DCI format 0, and the downlink control channel whose CRC is scrambled by using the C-RNTI is not transmitted in the CSS corresponding to the first serving cell, so that a problem is avoided that some users cannot correctly detect the DCI 3 format and the DCI format 3A due to different understandings of different users about the payloads of DCI format 3 and DCI format 3A. Certainly, to resolve the foregoing problem, the payload of DCI format 0 or DCI format 1A may be determined according to the duplex mode of the first serving cell, and the payloads of DCI format 3 and DCI format 3A may be further determined, so as to perform transmission in the DCI format 3 and the DCI format 3A; or multiple users corresponding to DCI format 3 or DCI format 3A all use the DCI format corresponding to the FDD or use the DCI format corresponding to the TDD, that is, users who use the DCI format corresponding to the FDD are put into a group, and users who use the DCI format corresponding to the TD D are put into a group.

Embodiment 2

Figure 2:
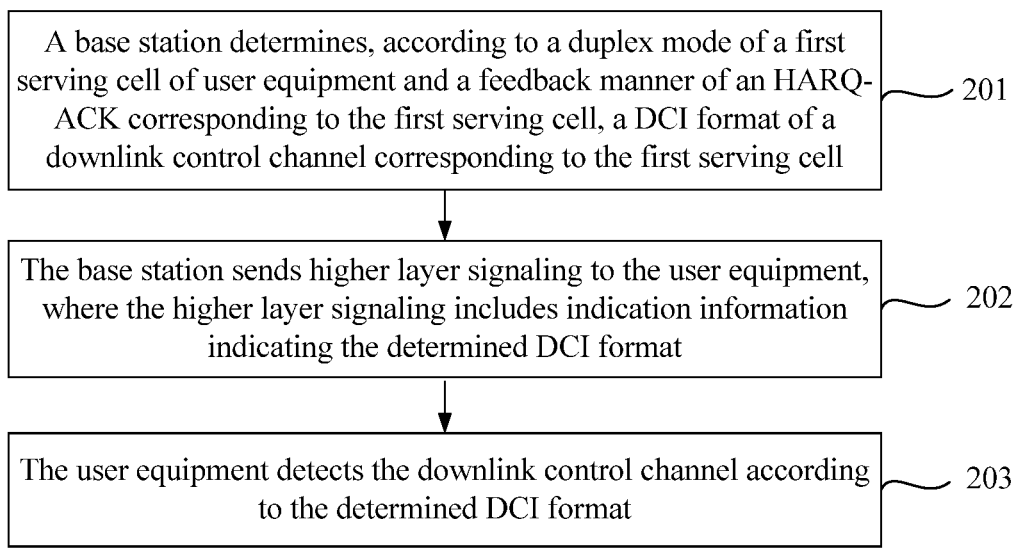
FIG. 2 shows a flowchart of a control information transmission method according to another embodiment of the present invention.

FIG. 2 shows a flowchart of a control information transmission method according to another embodiment of the present invention. As shown in FIG. 2, the control information transmission method may include the following steps.

Step 201: A base station determines, according to a duplex mode of a first serving cell of user equipment and a feedback manner of an HARQ-ACK corresponding to the first serving cell, a DCI format of a downlink control channel corresponding to the first serving cell, where the first serving cell is a serving cell corresponding to the user equipment.

Specifically, in this embodiment, for explanations and examples related to the serving cell corresponding to the user equipment, the first serving cell, a second serving cell, the downlink control channel, the DCI format of the downlink control channel corresponding to the first serving cell, and the like, reference may be made to the related description in the foregoing embodiment, and details are not described herein again.

In addition, corresponding to the scenario 1 to the scenario 6 in the foregoing embodiment, specific scenarios in which the base station determines, according to the duplex mode of the first serving cell of the user equipment and the feedback manner of the HARQ-ACK corresponding to the first serving cell, the DCI format of the downlink control channel corresponding to the first serving cell may include any one or more of the following scenarios. Scenario 1: if the duplex mode of the first serving cell is FDD, a duplex mode of the second serving cell of the user equipment is TDD, and the HARQ-ACK corresponding to the first serving cell is transmitted over a physical uplink control channel PUCCH that is carried by the second serving cell, the base station determines the DCI format of the downlink control channel corresponding to the first serving cell as a DCI format corresponding to the TDD. Scenario 2: if the duplex mode of the first serving cell is FDD, and the HARQ-ACK corresponding to the first serving cell is fed back in some uplink subframes of a radio frame, the base station determines the DCI format of the downlink control channel corresponding to the first serving cell as a DCI format corresponding to TDD. Scenario 3: if the duplex mode of the first serving cell is FDD, and the HARQ-ACK corresponding to the first serving cell is transmitted over a PUCCH that is carried by an FDD serving cell, the base station determines the DCI format corresponding to the first serving cell as a DCI format corresponding to the FDD. Scenario 4: if the duplex mode of the first serving cell is FDD: in a case in which the user equipment has multiple uplink transmission capabilities in one subframe, the base station determines the DCI format of the downlink control channel corresponding to the first serving cell as a DCI format corresponding to the FDD; and in a case in which the user equipment has a single uplink transmission capability in one subframe, the base station determines the DCI format of the downlink control channel corresponding to the first serving cell as a DCI format corresponding to TDD. Scenario 5: if the duplex mode of the first serving cell is TDD, a duplex mode of the second serving cell of the user equipment is FDD, and the HARQ-ACK corresponding to the first serving cell is transmitted over a PUCCH that is carried by the second serving cell, the base station determines the DCI format of the downlink control channel corresponding to the first serving cell as a DCI format corresponding to the FDD. Scenario 6: if the duplex mode of the first serving cell is TDD, and the HARQ-ACK corresponding to the first serving cell is transmitted over a PUCCH that is carried by a TDD serving cell, the base station determines the DCI format corresponding to the first serving cell as a DCI format corresponding to the TDD.

In addition to carrying indication information indicating the DCI format of the downlink control channel corresponding to the first serving cell, the higher layer signaling may further carry indication information for configuring the first serving cell for the user equipment.

Step 203: The base station sends the downlink control channel according to the determined DCI format.

Specifically, when the duplex mode of the first serving cell is the FDD, and the determined DCI format is the DCI format corresponding to the TDD, the base station sends the downlink control channel according to the DCI format corresponding to the TDD; when the DCI format of the downlink control channel is DCI format 1A or DCI format 0, and a CRC of the downlink control channel is scrambled by using a C-RNTI, the downlink control channel is carried only in UE-specific search space (USS) corresponding to the first serving cell. CSS corresponding to the first serving cell, the CSS, may refer to CSS for the downlink control channel. Alternatively, when the duplex mode of the first serving cell is the FDD, and the determined DCI format is the DCI format corresponding to the TDD, the base station does not send, in USS corresponding to the first serving cell, a downlink control channel whose DCI format is DCI format 1A or DCI format 0 and whose CRC is scrambled by using a C-RNTI.

The CSS corresponding to the first serving cell serves multiple user equipments, and DCI formats in which information is possibly transmitted in the common search space include DCI format 0, DCI format 1A, DCI format 3, DCI format 3A, and DCI format 1C. In order to reduce times of blind detection performed by a user, payloads of DCI format 0 and DCI format 1A are equalized, that is, the base station may add a padding bit to make the payloads of DCI format 0 and DCI format 1A the same, or in other words, to make quantities of bits of information corresponding to DCI format 0 and DCI format 1 the same. Likewise, payloads of DCI format 3 and DCI format 3A are equalized with the payload of DCI format 0, that is, equalized with the payload of DCI format 1A. DCI format 3 and DCI format 3A are related to multiple users, that is, information carried by DCI format 3 and DCI format 3A needs to be notified to the multiple users, that is, the multiple users need to perform detection on the downlink control channel according to the same payloads of DCI format 3 and DCI format 3A. In step 203, in some scenarios, the DCI format determined by the base station may be not determined according to the duplex mode of the first serving cell. For example, when the duplex mode of the first serving cell in step 201 is the FDD, and the DCI format determined in step 201 is the DCI format corresponding to the TDD, the DCI format determined by the base station is not determined according to the duplex mode FDD of the first serving cell. However, from a user's perspective, DCI formats determined by different users are different. For example, a DCI format determined by some users is the DCI format corresponding to the FDD, and a DCI format determined by other users is the DCI format corresponding to the TDD, and in this case, sizes of DCI format 1A determined by different users are inconsistent. Therefore, when detecting DCI format 3 and DCI format 3A, different users may perform detection on a downlink control channel whose DCI format is DCI format 3 or DCI format 3A on an assumption that sizes of DCI format 3 and DCI format 3A are different; consequently, some users cannot correctly detect the downlink control channel whose DCI format is DCI format 3 or DCI format 3A.

Between step 201 and step 203, the method may further include step 202: the base station sends higher layer signaling to the user equipment, where the higher layer signaling includes indication information indicating the determined DCI format.

According to the control information transmission method in this embodiment, when different carrier aggregation manners are used, a base station may determine, according to a duplex mode and an HARQ-ACK feedback manner, a DCI format corresponding to a control channel, and therefore the method can be flexibly applied to various scenarios.

In addition, the base station notifies, by using the higher layer signaling, the user equipment of the downlink control information DCI format of the downlink control channel corresponding to the first serving cell. The base station may configure, according to a specific application scenario, a capability of the UE, an HARQ-ACK feedback mechanism, and the like, the DCI format corresponding to the FDD or the DCI format corresponding to the TDD, and therefore the present invention is flexibly applied to various scenarios. In addition, there is no need to describe all scenarios in which different DCI formats are possibly used in standard protocols, which saves efforts in standardization.

In addition, when the duplex mode of the first serving cell is the FDD, the duplex mode of the second serving cell is the FDD, and the HARQ-ACK corresponding to the first serving cell is transmitted over the PUCCH that is carried by the second serving cell (refer to the scenario 1), the DCI format is the DCI format corresponding to the TDD. By reusing the DCI format corresponding to the TDD, in one aspect, a new DCI format can be not added; in another aspect, the first serving cell whose duplex mode is the FDD can also obtain a downlink assignment index field, so that the user equipment can perform HARQ-ACK feedback according to the downlink assignment index field. For example, the user equipment performs HARQ-ACK sorting according to the downlink assignment index field, so that an HARQ-ACK bit can receive relatively equal protection during encoding, and HARQ-ACK transmission performance is improved.

In addition, when the duplex mode of the first serving cell is the TDD, the duplex mode of the second serving cell is the FDD, and the HARQ-ACK corresponding to the first serving cell is transmitted over the PUCCH that is carried by the second serving cell (refer to the scenario 5), the DCI format is the DCI format corresponding to the FDD, so that a redundant indication field such as a DAI field does not need to be transmitted during transmission on downlink control channel. Therefore, a size of the DCI format is reduced, and transmission performance of useful information is improved.

Further, in this embodiment of the present invention, the DCI format of the downlink control channel is not allowed to be DCI format 1A or DCI format 0, and the downlink control channel whose CRC is scrambled by using the C-RNTI is not transmitted in the CSS corresponding to the first serving cell, so that a problem is avoided that some users cannot correctly detect DCI 3 and DCI 3A due to different understandings of different users about the payloads of DCI format 3 and DCI format 3A. Certainly, to resolve the foregoing problem, the payload of DCI format 0 or DCI format 1A may be determined according to the duplex mode of the first serving cell, and the payloads of DCI format 3 and DCI format 3A may be further determined, so as to perform transmission in the DCI format 3 and the DCI format 3A; or DCI formats used by a group of users corresponding to DCI format 3 and DCI format 3A are specified to be consistent, that is, when the base station groups user equipment, grouping is performed according to DCI format 1A or DCI format 0 that is possibly used by the user equipment, for example, users who use the DCI format corresponding to the FDD are put into a group, and users who use the DCI format corresponding to the TDD are put into a group; or multiple users corresponding to DCI format 3 or DCI format 3A all use the DCI format corresponding to the FDD or use the DCI format corresponding to the TDD.

Embodiment 3

Figure 3:
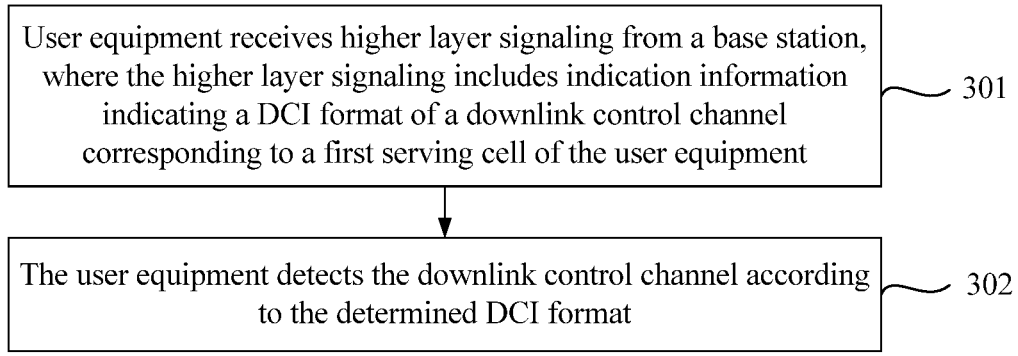
FIG. 3 shows a flowchart of a control information transmission method according to still another embodiment of the present invention.

FIG. 3 shows a flowchart of a control information transmission method according to still another embodiment of the present invention. As shown in FIG. 3, the control information transmission method may include the following steps.

Step 301: User equipment receives higher layer signaling from a base station, where the higher layer signaling includes indication information indicating a DCI format of a downlink control channel corresponding to a first serving cell of the user equipment, and the DCI format is determined by the base station according to a duplex mode of the first serving cell and a feedback manner of an HARQ-ACK corresponding to the first serving cell.

Specifically, in this embodiment, for explanations and examples related to a serving cell corresponding to the user equipment, the first serving cell, a second serving cell, the downlink control channel, the DCI format of the downlink control channel corresponding to the first serving cell, and the like, reference may be made to the related description in the foregoing embodiment, and details are not described herein again.

The indication information included in the higher layer signaling may be determined in different application scenarios by the base station according to the duplex mode of the first serving cell and the feedback manner of the HARQ-ACK corresponding to the first serving cell. For details, reference may be made to the related description of the scenario 1 to the scenario 6 in the foregoing embodiments.

Step 302: The user equipment detects the downlink control channel according to the determined DCI format. For details, reference may be made to step 102 and its related description in the foregoing embodiment.

According to the control information transmission method in this embodiment, when different carrier aggregation manners are used, user equipment may determine, according to higher layer signaling received from a base station, a DCI format corresponding to a control channel. The base station may configure, according to a specific application scenario, a capability of the UE, an HARQ-ACK feedback mechanism, and the like, a DCI format corresponding to FDD or a DCI format corresponding to TDD, and therefore the present invention is flexibly applied to various scenarios. In addition, there is no need to describe all scenarios in which different DCI formats are possibly used in standard protocols, facilitating standardization work.

Embodiment 4

Figure 4:
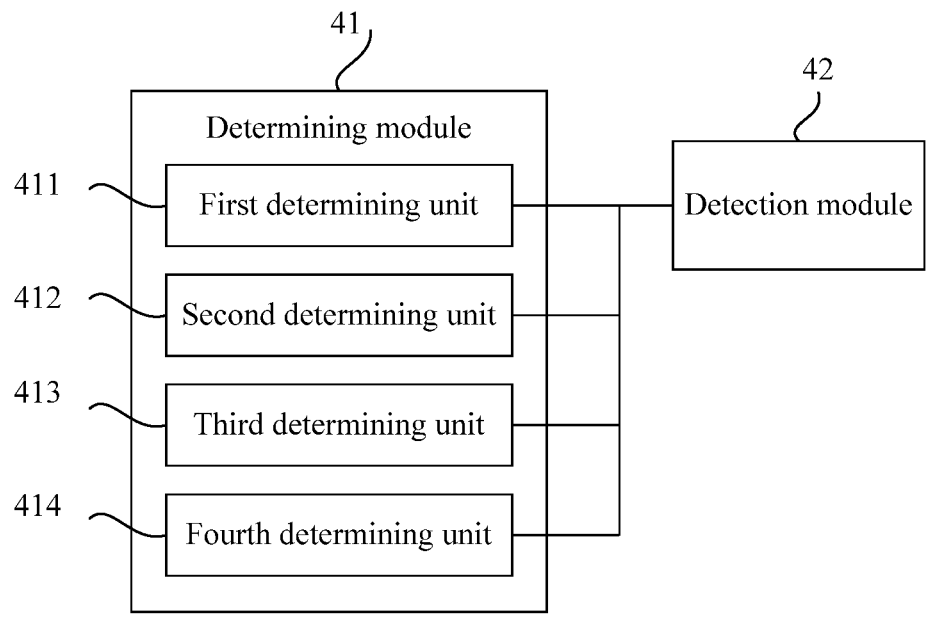
FIG. 4 shows a structural block diagram of user equipment according to an embodiment of the present invention.

FIG. 4 shows a structural block diagram of user equipment according to an embodiment of the present invention. As shown in FIG. 4, the user equipment may include: a determining module 41, configured to determine a downlink control information DCI format of a downlink control channel corresponding to a first serving cell, where the first serving cell is a serving cell corresponding to the user equipment, and the DCI format is determined by using a duplex mode of the first serving cell and a feedback manner of a hybrid automatic repeat request-acknowledgment HARQ-ACK corresponding to the first serving cell; and a detection module 42, configured to detect the downlink control channel according to the determined DCI format.

Specifically, in this embodiment, for explanations and examples related to the serving cell corresponding to the user equipment, the first serving cell, a second serving cell, the downlink control channel, the DCI format of the downlink control channel corresponding to the first serving cell, and the like, reference may be made to the related description in the foregoing embodiment, and details are not described herein again.

In a possible implementation manner, the determining module 41 is specifically configured to determine, according to the duplex mode of the first serving cell and the feedback manner of the HARQ-ACK corresponding to the first serving cell, the DCI format of the downlink control channel corresponding to the first serving cell.

In a possible implementation manner, the determining module 41 includes any one or more of the following units: a first determining unit 411, configured to: if the duplex mode of the first serving cell is frequency division duplex FDD, a duplex mode of the second serving cell of the user equipment is time division duplex TDD, and the HARQ-ACK corresponding to the first serving cell is transmitted over a physical uplink control channel PUCCH that is carried by the second serving cell, determine the DCI format of the downlink control channel corresponding to the first serving cell as a DCI format corresponding to the TDD, where reference may be made to the scenario 1 and its related description in the foregoing method embodiment; a second determining unit 412, configured to: if the duplex mode of the first serving cell is FDD, and the HARQ-ACK corresponding to the first serving cell is fed back in some uplink subframes of a radio frame, determine the DCI format of the downlink control channel corresponding to the first serving cell as a DCI format corresponding to TDD, where reference may be made to the scenario 2 and its related description in the foregoing method embodiment; a third determining unit 413, configured to: if the duplex mode of the first serving cell is FDD: in a case in which the user equipment has multiple uplink transmission capabilities in one subframe, determine the DCI format of the downlink control channel corresponding to the first serving cell as a DCI format corresponding to the FDD; and in a case in which the user equipment has a single uplink transmission capability in one subframe, determine the DCI format of the downlink control channel corresponding to the first serving cell as a DCI format corresponding to TDD, where reference may be made to the scenario 4 and its related description in the foregoing method embodiment; and a fourth determining unit 414, configured to: if the duplex mode of the first serving cell is TDD, a duplex mode of the second serving cell of the user equipment is FDD, and the HARQ-ACK corresponding to the first serving cell is transmitted over a PUCCH that is carried by the second serving cell, determine the DCI format of the downlink control channel corresponding to the first serving cell as a DCI format corresponding to the FDD, where reference may be made to the scenario 5 and its related description in the foregoing method embodiment.

In a possible implementation manner, the detection module 42 is specifically configured to: when the duplex mode of the first serving cell is the FDD, and the determined DCI format is the DCI format corresponding to the TDD, detect the downlink control channel according to the DCI format corresponding to the TDD; and it is not expected that a DCI format of the downlink control channel that is detected in common search space CSS corresponding to the first serving cell is DCI format 1A, or that a cyclic redundancy check CRC of the detected downlink control channel is scrambled by using a cell radio network temporary identifier C-RNTI. For details, reference may be made to step 102 and its related description in the foregoing method embodiment.

According to the user equipment in this embodiment, when different carrier aggregation manners are used, a DCI format corresponding to a control channel may be determined according to a duplex mode and an HARQ-ACK feedback manner, and therefore the user equipment can be flexibly applied to various scenarios.

Embodiment 5

Figure 5:
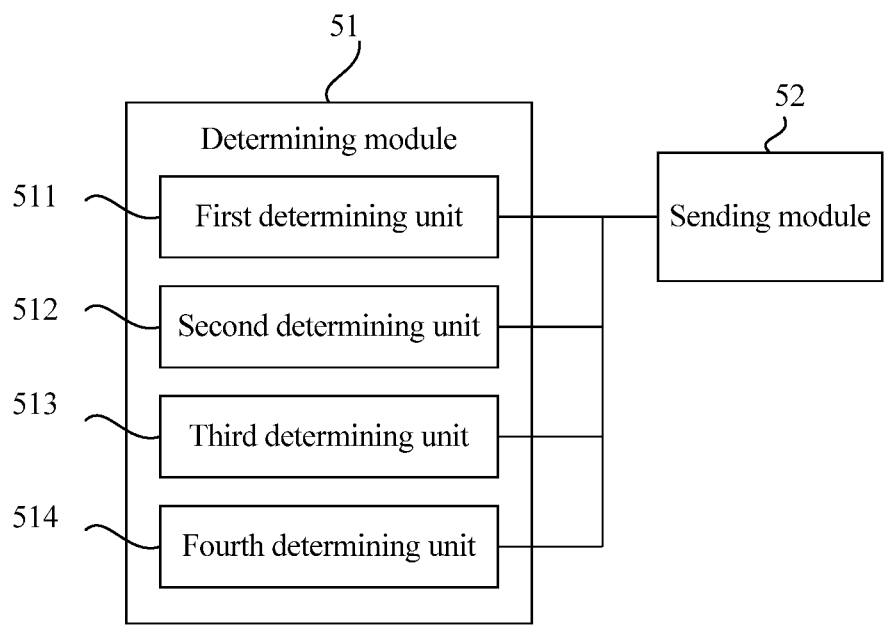
FIG. 5 shows a structural block diagram of a base station according to an embodiment of the present invention.

FIG. 5 shows a structural block diagram of a base station according to an embodiment of the present invention. As shown in FIG. 5, the base station may include: a determining module 51, configured to determine, according to a duplex mode of a first serving cell of user equipment and a feedback manner of an HARQ-ACK corresponding to the first serving cell, a DCI format of a downlink control channel corresponding to the first serving cell, where the first serving cell is a serving cell corresponding to the user equipment; and a sending module 52, configured to send the downlink control channel according to the determined DCI format.

Specifically, in this embodiment, for explanations and examples related to the serving cell corresponding to the user equipment, the first serving cell, a second serving cell, the downlink control channel, the DCI format of the downlink control channel corresponding to the first serving cell, and the like, reference may be made to the related description in the foregoing embodiment, and details are not described herein again.

In a possible implementation manner, the sending module 52 is further configured to send higher layer signaling to the user equipment after the determining module 51 determines the DCI format of the downlink control channel corresponding to the first serving cell of the user equipment, and before the sending module 52 sends the downlink control channel according to the determined DCI format, where the higher layer signaling includes indication information indicating the determined DCI format.

In a possible implementation manner, the determining module 51 may include any one or more of the following units: a first determining unit 511, configured to: if the duplex mode of the first serving cell is FDD, a duplex mode of the second serving cell of the user equipment is TDD, and the HARQ-ACK corresponding to the first serving cell is transmitted over a physical uplink control channel PUCCH that is carried by the second serving cell, determine the DCI format of the downlink control channel corresponding to the first serving cell as a DCI format corresponding to the TDD, where reference may be made to the scenario 1 and its related description in the foregoing method embodiment; a second determining unit 512, configured to: if the duplex mode of the first serving cell is FDD, and the HARQ-ACK corresponding to the first serving cell is fed back in some uplink subframes of a radio frame, determine the DCI format of the downlink control channel corresponding to the first serving cell as a DCI format corresponding to TDD, where reference may be made to the scenario 2 and its related description in the foregoing method embodiment; a third determining unit 513, configured to: if the duplex mode of the first serving cell is FDD: in a case in which the user equipment has multiple uplink transmission capabilities in one subframe, determine the DCI format of the downlink control channel corresponding to the first serving cell as a DCI format corresponding to the FDD; and in a case in which the user equipment has a single uplink transmission capability in one subframe, determine, the DCI format of the downlink control channel corresponding to the first serving cell as a DCI format corresponding to TDD, where reference may be made to the scenario 4 and its related description in the foregoing method embodiment; and a fourth determining unit 514, configured to: if the duplex mode of the first serving cell is TDD, a duplex mode of the second serving cell of the user equipment is FDD, and the HARQ-ACK corresponding to the first serving cell is transmitted over a PUCCH that is carried by the second serving cell, determine the DCI format of the downlink control channel corresponding to the first serving cell as a DCI format corresponding to the FDD, where reference may be made to the scenario 5 and its related description in the foregoing method embodiment.

In a possible implementation manner, the sending module 52 is configured to: if the duplex mode of the first serving cell is the FDD, and the determined DCI format is the DCI format corresponding to the TDD, send the downlink control channel according to the DCI format corresponding to the TDD; and when the DCI format of the downlink control channel is DCI format 1A, and a CRC of the downlink control channel is scrambled by using a C-RNTI, the downlink control channel is carried by UE-specific search space USS corresponding to the first serving cell. For details, reference may be made to step 203 and its related description in the foregoing method embodiment.

According to the base station in this embodiment, when different carrier aggregation manners are used, a DCI format corresponding to a control channel may be determined according to a duplex mode and an HARQ-ACK feedback manner, and therefore the base station can be flexibly applied to various scenarios.

In addition, the sending module of the base station notifies, by using the higher layer signaling, the user equipment of the downlink control information DCI format of the downlink control channel corresponding to the first serving cell. The base station may configure, according to a specific application scenario, a capability of the UE, an HARQ-ACK feedback mechanism, and the like, the DCI format corresponding to the FDD or the DCI format corresponding to the TDD, and therefore the present invention is flexibly applied to various scenarios. In addition, there is no need to describe all scenarios in which different DCI formats are possibly used in standard protocols, facilitating standardization work.

Embodiment 6

Figure 6:
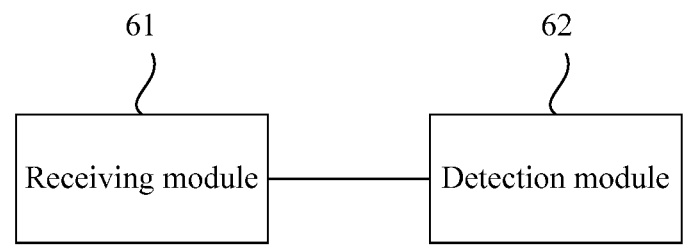
FIG. 6 shows a structural block diagram of user equipment according to another embodiment of the present invention.

FIG. 6 shows a structural block diagram of user equipment according to another embodiment of the present invention. As shown in FIG. 6, the user equipment may include: a receiving module 61, configured to receive higher layer signaling from a base station, where the higher layer signaling includes indication information indicating a DCI format of a downlink control channel corresponding to a first serving cell of the user equipment, and the DCI format is determined by the base station according to a duplex mode of the first serving cell and a feedback manner of an HARQ-ACK corresponding to the first serving cell; and a detection module 62, configured to detect the downlink control channel according to the determined DCI format.

Specifically, in this embodiment, for explanations and examples related to a serving cell corresponding to the user equipment, the first serving cell, a second serving cell, the downlink control channel, the DCI format of the downlink control channel corresponding to the first serving cell, and the like, reference may be made to the related description in the foregoing embodiment, and details are not described herein again.

In a possible implementation manner, the detection module 62 is specifically configured to: when the duplex mode of the first serving cell is FDD, and the determined DCI format is a DCI format corresponding to TDD, detect the downlink control channel according to the DCI format corresponding to the TDD; and it is not expected that a DCI format of the downlink control channel that is detected in CSS corresponding to the first serving cell is DCI format 1A, or that a CRC of the detected downlink control channel is scrambled by using a C-RNTI.

According to the user equipment in this embodiment, when different carrier aggregation manners are used, a DCI format corresponding to a control channel may be determined according to higher layer signaling received from a base station. The base station may configure, according to a specific application scenario, a capability of the UE, an HARQ-ACK feedback mechanism, and the like, a DCI format corresponding to FDD or a DCI format corresponding to TDD, and therefore the present invention is flexibly applied to various scenarios. In addition, there is no need to describe all scenarios in which different DCI formats are possibly used in standard protocols, facilitating standardization work.

Embodiment 7

Figure 7:
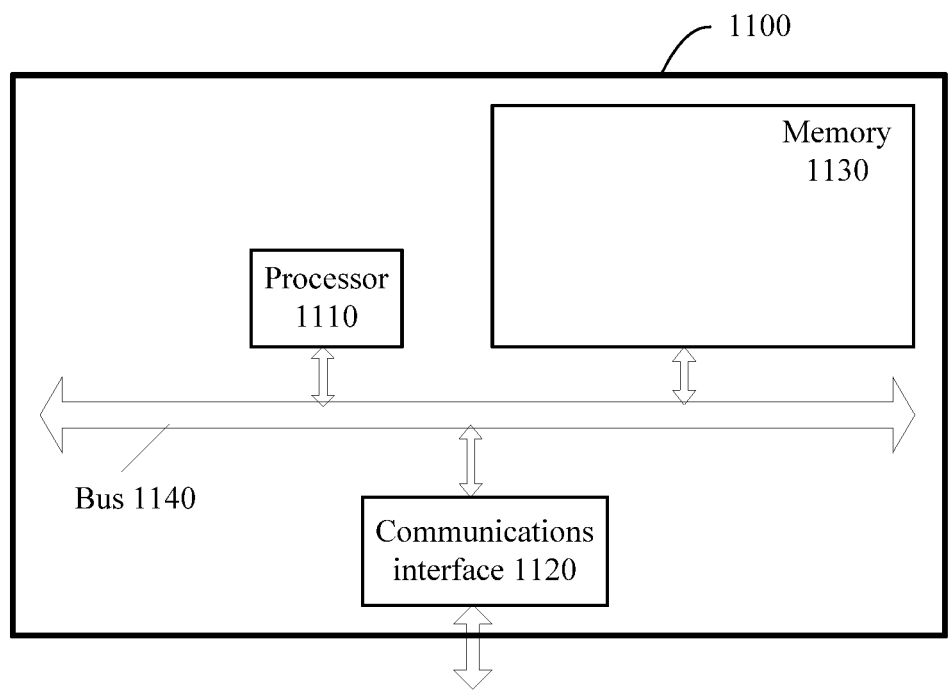
FIG. 7 shows a structural block diagram of user equipment according to another embodiment of the present invention.

FIG. 7 shows a structural block diagram of user equipment according to another embodiment of the present invention. The control information transmission device 1100 may be a host server having a computing capability, a personal computer PC, a portable computer or a terminal that is carryable, or the like. Specific implementation of a computing node is not limited in this embodiment of the present invention.

The control information transmission device 1100 includes a processor 1110, a communications interface 1120, a memory 1130, and a bus 1140. The processor 1110, the communications interface 1120, and the memory 1130 completes intercommunication by using the bus 1140.

The communications interface 1120 is configured to communicate with a network device, where the network device includes, for example, a virtual machine management center, a shared memory, and the like.

The processor 1110 is configured to execute a program. The processor 1110 may be a central processing unit (CPU), or an application-specific integrated circuit (ASIC), or one or more integrated circuits configured to implement this embodiment of the present invention.

The memory 1130 is configured to store a file. The memory 1130 may include a high-speed RAM memory, and may further include a non-volatile memory, for example, at least one disk memory. The memory 1130 may also be a memory array. The memory 1130 may further be divided into blocks, and the blocks can be combined into a virtual volume according to a specific rule.

In a possible implementation manner, the foregoing program may be program code including a computer operation instruction. The program may be used to: determine a downlink control information DCI format of a downlink control channel corresponding to a first serving cell, where the first serving cell is a serving cell corresponding to the user equipment, and the DCI format is determined by using a duplex mode of the first serving cell and a feedback manner of a hybrid automatic repeat request-acknowledgment HARQ-ACK corresponding to the first serving cell; and detect the downlink control channel according to the determined DCI format.

The program may be further used to: receive higher layer signaling from a base station, where the higher layer signaling includes indication information indicating a DCI format of a downlink control channel corresponding to a first serving cell of the user equipment, and the DCI format is determined by the base station according to a duplex mode of the first serving cell and a feedback manner of an HARQ-ACK corresponding to the first serving cell; and detect the downlink control channel according to the determined DCI format.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in a form of computer software and sold or used as an independent product, it can be deemed to some extent that all or some of the technical solutions of the present invention (for example, the part contributing to the prior art) are implemented in a form of a computer software product. The computer software product is generally stored in a computer-readable non-volatile storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

Embodiment 8

Figure 8:
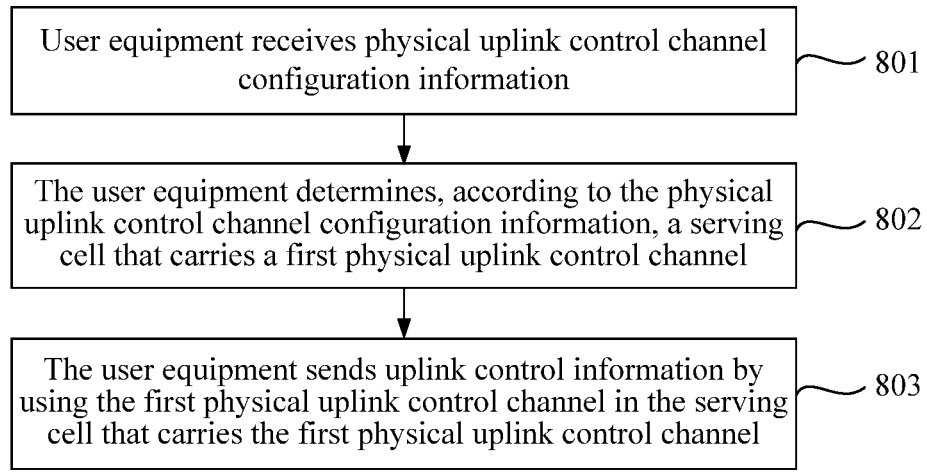
FIG. 8 shows a flowchart of a control information transmission method according to still another embodiment of the present invention.

FIG. 8 shows a flowchart of a control information transmission method according to still another embodiment of the present invention. As shown in FIG. 8, for transmission of uplink control information in a scenario of aggregation of different duplex modes and/or aggregation between base stations, the control information transmission method may specifically include the following steps.

Step 801: User equipment receives physical uplink control channel configuration information.

In this step, the user equipment receives the physical uplink control channel (PUCCH) configuration information, and the user equipment may transmit uplink control information according to the PUCCH configuration information.

Specifically, the PUCCH configuration information may include indication information indicating a serving cell that carries a first physical uplink control channel, where the indication information may be a cell index of the serving cell that carries the first physical uplink control channel, and the serving cell that carries the first physical uplink control channel may be a secondary serving cell of the user equipment. If a PUCCH is transmitted only in one serving cell for the user equipment, a serving cell in which an uplink control channel is transmitted may be flexibly configured according to an actual application scenario by using the indication information indicating the serving cell that carries the first physical uplink control channel. Compared with that a PUCCH is transmitted only in a primary serving cell of user equipment, according to this method, transmission performance of uplink control information can be improved and a data transmission delay can be reduced. For example, when a duplex mode of the primary serving cell of the user equipment is TDD, the serving cell that carries the first physical uplink control channel may be configured as a secondary serving cell that is of the user equipment and whose duplex mode is FDD. Because an uplink subframe can always be obtained in an FDD serving cell, in one aspect, transmission performance of the uplink control information can be improved by transmitting the uplink control information over more uplink subframes, and in another aspect, an RTT (round trip time) delay of a physical downlink shared channel PDSCH can be reduced. By means of the indication information indicating the serving cell that carries the first physical uplink control channel, the first physical uplink control channel may be further configured together with a second physical uplink control channel of the user equipment to transmit the uplink control information of the user equipment. For example, in this case, the second physical uplink control channel of the user equipment is a physical uplink control channel that is transmitted in the primary serving cell of the user equipment. If the first physical uplink control channel is configured in the PUCCH configuration information, the user equipment transmits the uplink control information over the first physical uplink control channel and the second physical uplink control channel. Compared with that a PUCCH is transmitted only in the primary serving cell of the user equipment, this method, in one aspect, may have HARQ-ACK timing of each serving cell not modified, and in another aspect, may be applicable to aggregation between base stations. It should be noted that if the PUCCH configuration information does not include the first physical uplink control channel configuration information in this case, the user equipment transmits the uplink control information only in the primary serving cell.

The PUCCH configuration information may further include indication information indicating a serving cell that carries the second physical uplink control channel, where the indication information may be a cell index of the serving cell that carries the second physical uplink control channel. If the PUCCH configuration information includes the indication information indicating the serving cell that carries the second physical uplink control channel, the first physical uplink control channel and the second physical uplink control channel may be configured for the user equipment by using the indication information indicating the serving cell that carries the first physical uplink control channel and the indication information indicating the serving cell that carries the second physical uplink control channel, so as to transmit the uplink control information. In addition, the serving cell that carries the first physical uplink control channel and the serving cell that carries the second physical uplink control channel may be flexibly configured according to an actual application scenario, thereby improving transmission performance of the uplink control information. In addition, this method may have HARQ-ACK timing of each serving cell not modified, and may be applicable to aggregation between base stations.

The PUCCH configuration information may further include indication information indicating a serving cell that is in a first serving cell set and that is corresponding to the first physical uplink control channel, where the indication information may be a cell index of the serving cell that is in the first serving cell set and that is corresponding to the first physical uplink control channel; and the PUCCH configuration information may further include indication information indicating a serving cell that is in a second serving cell set and that is corresponding to the second physical uplink control channel, where the indication information may be a cell index of the serving cell that is in the second serving cell set and that is corresponding to the second physical uplink control channel. When the user equipment has multiple serving cells, by using the indication information indicating the serving cell that is in the first serving cell set and that is corresponding to the first physical uplink control channel and the indication information indicating the serving cell that is in the second serving cell set and that is corresponding to the second physical uplink control channel, the serving cells corresponding to the first physical uplink control channel and the second physical uplink control channel may be configured, that is, a serving cell corresponding to the uplink control information that is transmitted over the first physical uplink control channel is configured, and a serving cell corresponding to the uplink control information that is transmitted over the second physical uplink control channel is configured.

The PUCCH configuration information may further include indication information indicating a format of the first physical uplink control channel, where the format of the first physical uplink control channel may be one of PUCCH format 1a, PUCCH format 1b, channel selection, and PUCCH format 3. The PUCCH configuration information may further include indication information indicating a format of the second physical uplink control channel, where the format of the second physical uplink control channel may be one of PUCCH format 1a, PUCCH format 1b, channel selection, and PUCCH format 3.

Step 802: The user equipment determines, according to the physical uplink control channel configuration information, a serving cell that carries a first physical uplink control channel.

In this step, the user equipment determines, according to the physical uplink control channel configuration information received in step 801, the serving cell that carries the first physical uplink control channel.

Specifically, the user equipment may determine, according to the indication information that is in the physical uplink control channel configuration information and that indicates the serving cell carrying the first physical uplink control channel, the serving cell that carries the first physical uplink control channel, and further may determine, according to the cell index that is in the physical uplink control channel configuration information and that is of the serving cell carrying the first uplink control channel, the serving cell that carries the first physical uplink control channel, where the serving cell that carries the first physical uplink control channel is the secondary serving cell of the user equipment. A beneficial effect is as described in step 801, and details are not described herein again.

In this step, the user equipment may further determine, according to the physical uplink control channel configuration information, the serving cell that carries the first physical uplink control channel and the serving cell that carries the second physical uplink control channel, which may further be: the user equipment determines, according to the cell index that is in the physical uplink control channel configuration information and that is of the serving cell carrying the first physical uplink control channel, the serving cell that carries the first physical uplink control channel; and determines, according to the cell index that is in the physical uplink control channel configuration information and that is of the serving cell carrying the second physical uplink control channel, the serving cell that carries the second physical uplink control channel. A beneficial effect is as described in step 801, and details are not described herein again.

Step 803: The user equipment sends uplink control information by using the first physical uplink control channel in the serving cell that carries the first physical uplink control channel.

In this step, the user equipment sends the uplink control information by using the first physical uplink control channel in the serving cell that carries the first physical uplink control channel. In this case, the PUCCH is transmitted only in one serving cell.

This step may further be: the user equipment sends first uplink control information by using the first physical uplink control channel in the serving cell that carries the first physical uplink control channel; and the user equipment sends second uplink control information by using the second physical uplink control channel in the primary serving cell. In this case, the PUCCH may be sent in the primary serving cell and a secondary serving cell of the user equipment. In this case, if the first physical uplink control channel is configured in the PUCCH configuration information, the user equipment transmits the uplink control information over the configured first physical uplink control channel and the second physical uplink control channel that is carried by the primary serving cell. A beneficial effect is as described in step 801, and details are not described herein again.

If step 802 is: determining, according to the physical uplink control channel configuration information, the serving cell that carries the first physical uplink control channel and the serving cell that carries the second physical uplink control channel, step 803 may further be: the user equipment sends the first uplink control information by using the first physical uplink control channel in the serving cell that carries the first physical uplink control channel, and sends the second uplink control information in the serving cell that carries the second physical uplink control channel.

In this embodiment of the present invention, the first uplink control information is corresponding to the first serving cell set, the second uplink control information is corresponding to the second serving cell set, and the first serving cell set includes at least one serving cell that does not belong to the second serving cell set. The first serving cell set and the second serving cell set may be determined in multiple manners. For example, a duplex mode of a serving cell in the first serving cell set may be frequency division duplex FDD, and a duplex mode of a serving cell in the second serving cell set may be time division duplex TDD; or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link; or a serving cell included in the first serving cell set and a serving cell included in the second physical cell set are determined according to the physical uplink control channel configuration information.

It should be noted that the uplink control information UCI in this step may be a hybrid automatic repeat request HARQ-ACK, channel state information CSI, a scheduling request SR, or the like. Types of the first uplink control information and the second uplink control information may be the same or may be different.

This embodiment provides an uplink control information transmission method, which resolves a problem of how to transmit uplink control information in a scenario of aggregation of different duplex modes and/or aggregation between base stations. If a PUCCH is transmitted only in one serving cell, a serving cell in which an uplink control channel is transmitted may be flexibly configured according to an actual application scenario by using indication information indicating a serving cell that carries a first physical uplink control channel. Compared with that a PUCCH is transmitted only in a primary serving cell of user equipment, according to this method, transmission performance of uplink control information can be improved and a data transmission delay can be reduced. For example, when a duplex mode of the primary serving cell of the user equipment is TDD, the serving cell that carries the first physical uplink control channel may be configured as a secondary serving cell that is of the user equipment and whose duplex mode is FDD. Because an uplink subframe can always be obtained in an FDD serving cell, in one aspect, transmission performance of the uplink control information can be improved by transmitting the uplink control information over more uplink subframes, and in another aspect, an RTT (round trip time) delay of a physical downlink shared channel PDSCH can be reduced. By means of the indication information indicating the serving cell that carries the first physical uplink control channel, the first physical uplink control channel may be further configured together with a second physical uplink control channel of the user equipment to transmit the uplink control information of the user equipment. For example, in this case, the second physical uplink control channel of the user equipment is a physical uplink control channel that is transmitted in the primary serving cell of the user equipment. If the first physical uplink control channel is configured in the PUCCH configuration information, the user equipment transmits the uplink control information over the first physical uplink control channel and the second physical uplink control channel. Compared with that a PUCCH is transmitted only in the primary serving cell of the user equipment, this method, in one aspect, may have HARQ-ACK timing of each serving cell not modified, and in another aspect, may be applicable to aggregation between base stations. It should be noted that if the PUCCH configuration information does not include the first physical uplink control channel configuration information in this case, the user equipment transmits the uplink control information only in the primary serving cell. The first physical uplink control channel and the second physical uplink control channel may be configured for the user equipment by using the indication information indicating the serving cell that carries the first physical uplink control channel and indication information indicating the serving cell that carries the second physical uplink control channel, so as to transmit the uplink control information. In addition, the serving cell that carries the first physical uplink control channel and the serving cell that carries the second physical uplink control channel may be flexibly configured according to an actual application scenario, thereby improving transmission performance of the uplink control information. In addition, this method may have HARQ-ACK timing of each serving cell not modified, and may be applicable to aggregation between base stations.

Embodiment 9

Figure 9:
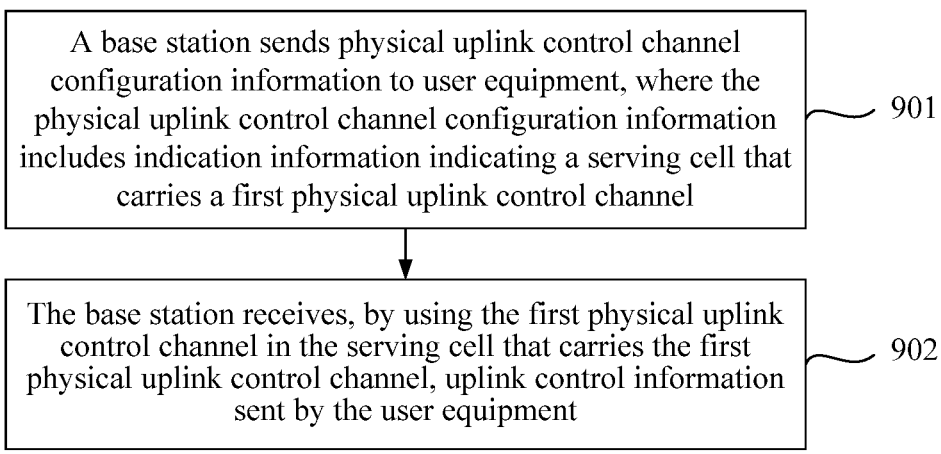
FIG. 9 shows a flowchart of a control information transmission method according to still another embodiment of the present invention.

FIG. 9 shows a flowchart of a control information transmission method according to still another embodiment of the present invention. As shown in FIG. 9, for transmission of uplink control information in a scenario of aggregation of different duplex modes and/or aggregation between base stations, the control information transmission method may specifically include the following steps.

Step 901: A base station sends physical uplink control channel configuration information to user equipment, where the physical uplink control channel configuration information includes indication information indicating a serving cell that carries a first physical uplink control channel, and the serving cell is a serving cell corresponding to the user equipment.

In this step, the base station sends the physical uplink control channel configuration information to the user equipment, so that the user equipment can send uplink control information according to the physical uplink control channel configuration information.

Specifically, the indication information indicating the serving cell that carries the first physical uplink control channel may be a cell index of the serving cell that carries the first physical uplink control channel, and the serving cell that carries the first physical uplink control channel may be a secondary serving cell of the user equipment.

The physical uplink control channel configuration information may further include the indication information indicating the serving cell that carries the first physical uplink control channel and indication information indicating a serving cell that carries a second physical uplink control channel, and both the serving cell that carries the first physical uplink control channel and the serving cell that carries the second physical uplink control channel are serving cells corresponding to the user equipment. The indication information indicating the serving cell that carries the first physical uplink control channel may be the cell index of the serving cell that carries the first physical uplink control channel, and the indication information indicating the serving cell that carries the second physical uplink control channel may be a cell index of the serving cell that carries the second physical uplink control channel.

Other explanations of the PUCCH configuration information are as described in step 801 in the foregoing embodiment, and details are not described herein again.

Step 902: The base station receives, by using the first physical uplink control channel in the serving cell that carries the first physical uplink control channel, uplink control information sent by the user equipment.

In this step, the base station sends the uplink control information by using the first physical uplink control channel in the serving cell that carries the first physical uplink control channel. In this case, a PUCCH is transmitted only in one serving cell.

Further, this step may further be: the base station receives, by using the first physical uplink control channel in the serving cell that carries the first physical uplink control channel, first uplink control information sent by the user equipment; and receives, by using a second physical uplink control channel in a primary serving cell of the user equipment, second uplink control information sent by the user equipment.

This step may further be: the base station receives, by using the first physical uplink control channel in the serving cell that carries the first physical uplink control channel, the first uplink control information sent by the user equipment; and receives, by using the second physical uplink control channel in the serving cell that carries the second physical uplink control channel, the second uplink control information sent by the user equipment.

In this step, the first uplink control information is corresponding to a first serving cell set, the second uplink control information is corresponding to a second serving cell set, and the first serving cell set includes at least one serving cell that does not belong to the second serving cell set. For other explanations of the first serving cell set and the second serving cell set, reference may be made to the previous embodiment, and details are not described herein again.

This embodiment provides an uplink control information transmission method, which resolves a problem of how to transmit uplink control information in a scenario of aggregation of different duplex modes and/or aggregation between base stations. If a PUCCH is transmitted only in one serving cell, a serving cell in which an uplink control channel is transmitted may be flexibly configured according to an actual application scenario by using indication information indicating a serving cell that carries a first physical uplink control channel. Compared with that a PUCCH is transmitted only in a primary serving cell of user equipment, according to this method, transmission performance of uplink control information can be improved and a data transmission delay can be reduced. For example, when a duplex mode of the primary serving cell of the user equipment is TDD, the serving cell that carries the first physical uplink control channel may be configured as a secondary serving cell that is of the user equipment and whose duplex mode is FDD. Because an uplink subframe can always be obtained in an FDD serving cell, in one aspect, transmission performance of the uplink control information can be improved by transmitting the uplink control information over more uplink subframes, and in another aspect, an RTT (round trip time) delay of a physical downlink shared channel PDSCH can be reduced. By means of the indication information indicating the serving cell that carries the first physical uplink control channel, the first physical uplink control channel may be further configured together with a second physical uplink control channel of the user equipment to transmit the uplink control information of the user equipment. For example, in this case, the second physical uplink control channel of the user equipment is a physical uplink control channel that is transmitted in the primary serving cell of the user equipment. If the first physical uplink control channel is configured in the PUCCH configuration information, the user equipment transmits the uplink control information over the first physical uplink control channel and the second physical uplink control channel. Compared with that a PUCCH is transmitted only in the primary serving cell of the user equipment, this method, in one aspect, may have HARQ-ACK timing of each serving cell not modified, and in another aspect, may be applicable to aggregation between base stations. It should be noted that if the PUCCH configuration information does not include the first physical uplink control channel configuration information in this case, the user equipment transmits the uplink control information only in the primary serving cell. The first physical uplink control channel and the second physical uplink control channel may be configured for the user equipment by using the indication information indicating the serving cell that carries the first physical uplink control channel and indication information indicating the serving cell that carries the second physical uplink control channel, so as to transmit the uplink control information. In addition, the serving cell that carries the first physical uplink control channel and the serving cell that carries the second physical uplink control channel may be flexibly configured according to an actual application scenario, thereby improving transmission performance of the uplink control information. In addition, this method may have HARQ-ACK timing of each serving cell not modified, and may be applicable to aggregation between base stations.

Embodiment 10

Figure 10:
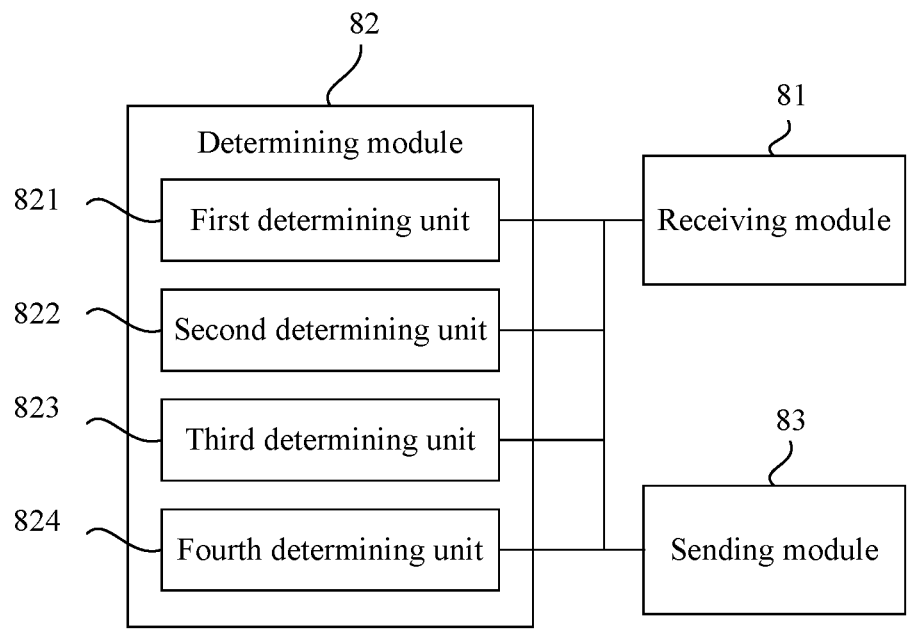
FIG. 10 shows a schematic structural diagram of user equipment according to still another embodiment of the present invention.

FIG. 10 shows a schematic structural diagram of user equipment according to still another embodiment of the present invention. As shown in FIG. 10, the user equipment includes a receiving module 81, a determining module 82, and a sending module 83.

The receiving module 81 is configured to receive physical uplink control channel configuration information. The determining module 82 is configured to determine, according to the physical uplink control channel configuration information, a serving cell that carries a first physical uplink control channel.

The sending module 83 is configured to send uplink control information by using the first physical uplink control channel in the serving cell that carries the first physical uplink control channel.

In a possible implementation manner, the uplink control channel configuration information includes a cell index of the serving cell that carries the first physical uplink control channel; and the determining module 82 is specifically configured to determine, according to the cell index that is in the physical uplink control channel configuration information and that is of the serving cell carrying the first uplink control channel, the serving cell that carries the first physical uplink control channel.

In a possible implementation manner, the serving cell that carries the first physical uplink control channel is a secondary serving cell of the user equipment.

In a possible implementation manner, the sending module 83 is specifically configured to: send first uplink control information by using the first physical uplink control channel in the serving cell that carries the first physical uplink control channel; and send second uplink control information by using a second physical uplink control channel in a primary serving cell of the user equipment.

In a possible implementation manner, the determining module 82 is specifically configured to: determine, according to the physical uplink control channel configuration information, the serving cell that carries the first physical uplink control channel and a serving cell that carries a second physical uplink control channel; and the sending module 83 is specifically configured to: send first uplink control information by using the first physical uplink control channel in the serving cell that carries the first physical uplink control channel; and send second uplink control information in the serving cell that carries the second physical uplink control channel.

In a possible implementation manner, the physical uplink control channel configuration information includes a cell index of the serving cell that carries the first physical uplink control channel and a cell index of the serving cell that carries the second physical uplink control channel; and the determining module 82 specifically includes: a first determining unit 821, configured to determine, according to the cell index that is in the physical uplink control channel configuration information and that is of the serving cell carrying the first physical uplink control channel, the serving cell that carries the first physical uplink control channel; and a second determining unit 822, configured to determine, according to the cell index that is in the physical uplink control channel configuration information and that is of the serving cell carrying the second physical uplink control channel, the serving cell that carries the second physical uplink control channel.

In a possible implementation manner, the first uplink control information is corresponding to a first serving cell set, the second uplink control information is corresponding to a second serving cell set, and the first serving cell set includes at least one serving cell that does not belong to the second serving cell set.

In a possible implementation manner, a duplex mode of a serving cell in the first serving cell set is frequency division duplex FDD, and a duplex mode of a serving cell in the second serving cell set is time division duplex TDD; or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link.

In a possible implementation manner, the determining module 82 is further configured to determine, according to the physical uplink control channel configuration information, a serving cell included in the first serving cell set and a serving cell included in the second physical cell set.

In a possible implementation manner, the physical uplink control channel configuration information includes a cell index of a serving cell that is in the first serving cell set and that is corresponding to the first physical uplink control channel and a cell index of a serving cell that is in the second serving cell set and that is corresponding to the second physical uplink control channel; and the determining module 82 further includes: a third determining unit 823, configured to determine the serving cell included in the first serving cell set according to the cell index, in the physical uplink control channel configuration information, of the serving cell that is in the first serving cell set and that is corresponding to the first physical uplink control channel; and a fourth determining unit 824, configured to determine the serving cell included in the second serving cell set according to the cell index, in the physical uplink control channel configuration information, of the serving cell that is in the second serving cell set and that is corresponding to the second physical uplink control channel.

Embodiment 11

Figure 11:
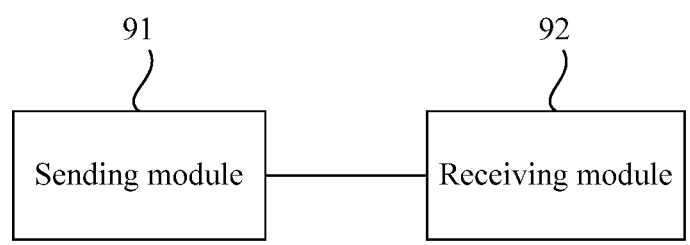
FIG. 11 shows a schematic structural diagram of a base station according to another embodiment of the present invention.

FIG. 11 shows a schematic structural diagram of a base station according to another embodiment of the present invention. As shown in FIG. 11, the base station includes: a sending module 91, configured to send physical uplink control channel configuration information to user equipment, where the physical uplink control channel configuration information includes indication information indicating a serving cell that carries a first physical uplink control channel, and the serving cell is a serving cell corresponding to the user equipment; and a receiving module 92, configured to receive, by using the first physical uplink control channel in the serving cell that carries the first physical uplink control channel, uplink control information sent by the user equipment.

In a possible implementation manner, the indication information indicating the serving cell that carries the first physical uplink control channel is a cell index of the serving cell that carries the first physical uplink control channel.

In a possible implementation manner, the serving cell that carries the first physical uplink control channel is a secondary serving cell of the user equipment.

In a possible implementation manner, the receiving module 92 is specifically configured to: receive, by using the first physical uplink control channel in the serving cell that carries the first physical uplink control channel, first uplink control information sent by the user equipment; and receive, by using a second physical uplink control channel in a primary serving cell of the user equipment, second uplink control information sent by the user equipment.

In a possible implementation manner, that the physical uplink control channel configuration information includes indication information indicating a serving cell that carries a first physical uplink control channel, and the serving cell that carries the first physical uplink control channel is a serving cell corresponding to the user equipment includes: the physical uplink control channel configuration information includes the indication information indicating the serving cell that carries the first physical uplink control channel and indication information indicating a serving cell that carries a second physical uplink control channel, and both the serving cell that carries the first physical uplink control channel and the serving cell that carries the second physical uplink control channel are serving cells corresponding to the user equipment; and the receiving module 92 is specifically configured to: receive, by using the first physical uplink control channel in the serving cell that carries the first physical uplink control channel, first uplink control information sent by the user equipment; and receive, by using the second physical uplink control channel in the serving cell that carries the second physical uplink control channel, second uplink control information sent by the user equipment.

In a possible implementation manner, the indication information indicating the serving cell that carries the first physical uplink control channel is a cell index of the serving cell that carries the first physical uplink control channel, and the indication information indicating the serving cell that carries the second physical uplink control channel is a cell index of the serving cell that carries the second physical uplink control channel.

In a possible implementation manner, the first uplink control information is corresponding to a first serving cell set of the user equipment, the second uplink control information is corresponding to a second serving cell set of the user equipment, and the first serving cell set includes at least one serving cell that does not belong to the second serving cell set.

In a possible implementation manner, a duplex mode of a serving cell in the first serving cell set is frequency division duplex FDD, and a duplex mode of a serving cell in the second serving cell set is time division duplex TDD; or a backhaul link between serving cells in the first serving cell set is an ideal backhaul link, a backhaul link between serving cells in the second serving cell set is an ideal backhaul link, and a backhaul link between a serving cell in the first serving cell set and a serving cell in the second serving cell set is a non-ideal backhaul link.

In a possible implementation manner, the physical uplink control channel configuration information includes a cell index of a serving cell that is in the first serving cell set and that is corresponding to the first physical uplink control channel and a cell index of a serving cell that is in the second serving cell set and that is corresponding to the second physical uplink control channel.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining, by user equipment, whether a feedback manner of a hybrid automatic repeat request-acknowledgment (HARQ-ACK) corresponding to a first serving cell is transmitted via a control channel associated with a second serving cell, wherein the first serving cell is a serving cell corresponding to the user equipment, the second serving cell is a serving cell that corresponds to the user equipment, and the second serving cell uses a duplex mode other than the duplex mode used by the first serving cell;
   determining, by the user equipment, a downlink control information (DCI) format of a downlink control channel corresponding to a first serving cell, wherein the DCI format is determined according to a duplex mode of the first serving cell and the feedback manner of the HARQ-ACK corresponding to the first serving cell; and
   detecting, by the user equipment, the downlink control channel according to the determined DCI format.

2. The method according to claim 1, wherein determining, by the user equipment, the DCI format of the downlink control channel corresponding to a first serving cell comprises:
   determining, by the user equipment according to the duplex mode of the first serving cell and the feedback manner of the HARQ-ACK corresponding to the first serving cell, information included in the DCI format of the downlink control channel corresponding to the first serving cell.

3. The method according to claim 2, wherein determining, by the user equipment according to the duplex mode of the first serving cell and the feedback manner of the HARQ-ACK corresponding to the first serving cell, the information included in the DCI format of the downlink control channel corresponding to the first serving cell comprises:
   when the duplex mode of the first serving cell is frequency division duplex (FDD), a duplex mode of the second serving cell is time division duplex (TDD), and the HARQ-ACK corresponding to the first serving cell is transmitted over a physical uplink control channel (PUCCH) that is carried by the second serving cell, determining, by the user equipment, the information included in the DCI format of the downlink control channel corresponding to the first serving cell includes a downlink assignment index (DAI) and a 4 bit HARQ process number;
   when the duplex mode of the first serving cell is FDD, and the HARQ-ACK corresponding to the first serving cell is fed back in uplink subframes of a radio frame, determining, by the user equipment, the information included in the DCI format of the downlink control channel corresponding to the first serving cell includes a DAI;
   when the duplex mode of the first serving cell is FDD, and:
      when the user equipment has a plurality of uplink transmission capabilities in one subframe, determining, by the user equipment, the information included in the DCI format of the downlink control channel corresponding to the first serving cell includes a 0 bit DAI; and
      when the user equipment has a single uplink transmission capability in one subframe, determining, by the user equipment, the information included in the DCI format of the downlink control channel corresponding to the first serving cell includes a DAI; or
   when the duplex mode of the first serving cell is TDD, a duplex mode of the second serving cell of the user equipment is FDD, and the HARQ-ACK corresponding to the first serving cell is transmitted over a PUCCH that is carried by the second serving cell, determining, by the user equipment, the information included in the DCI format of the downlink control channel corresponding to the first serving cell includes a 0 bit DAI and a 3 bit HARQ process number.

4. The method according to claim 3, wherein the DCI format of the downlink control channel corresponding to the first serving cell is DCI format 1, DCI format 1A, DCI format 1B, DCI format 1D, DCI format 2, DCI format 2A, DCI format 2B, DCI format 2C, or DCI format 2D.

5. The method according to claim 2, wherein determining, by the user equipment according to the duplex mode of the first serving cell and the feedback manner of the HARQ-ACK corresponding to the first serving cell, the information included in the DCI format of the downlink control channel corresponding to the first serving cell comprises:
   when the duplex mode of the first serving cell is frequency division duplex (FDD), a duplex mode of the second serving cell is time division duplex (TDD), and the HARQ-ACK corresponding to the first serving cell is transmitted over a physical uplink control channel (PUCCH) that is carried by the second serving cell, and when the DCI format of the downlink control channel corresponding to the first serving cell is DCI format 0 or DCI format 4, determining, by the user equipment, the information included in the DCI format of the downlink control channel corresponding to the first serving cell includes a downlink assignment index (DAI) when one or more of uplink-downlink configurations 1-6 are configured for the second serving cell; or
   when the duplex mode of the first serving cell is TDD, a duplex mode of the second serving cell is FDD, and the HARQ-ACK corresponding to the first serving cell is transmitted over a PUCCH that is carried by the second serving cell, and when the DCI format of the downlink control channel corresponding to the first serving cell is DCI format 0 or DCI format 4, determining, by the user equipment, the information included in the DCI format of the downlink control channel corresponding to the first serving cell includes a 0 bit DAI when one or more of uplink-downlink configurations 1-6 are configured for the second serving cell.

6. A method, comprising:
   determining, by a base station, whether a feedback manner of a hybrid automatic repeat request-acknowledgment (HARQ-ACK) corresponding to a first serving cell is transmitted via a control channel associated with a second serving cell, wherein the first serving cell is a serving cell corresponding to user equipment, the second serving cell is a further serving cell corresponding to the user equipment, and the second serving cell uses a duplex mode other than the duplex mode used by the first serving cell;
   determining, by a base station, a downlink control information (DCI) format of a downlink control channel corresponding to a first serving cell, wherein the DCI format is determined according to a duplex mode of the first serving cell and the feedback manner of the HARQ-ACK corresponding to the first serving cell; and sending, by the base station, the downlink control channel according to the determined DCI format.

7. The method according to claim 6, wherein determining, by the base station, the DCI format of the downlink control channel corresponding to the first serving cell, the DCI format being determined according to the duplex mode of the first serving cell and the feedback manner of the HARQ-ACK corresponding to the first serving cell comprises:

when the duplex mode of the first serving cell is frequency division duplex (FDD), a duplex mode of the second serving cell that serves the user equipment is time division duplex (TDD), and the HARQ-ACK corresponding to the first serving cell is transmitted over a physical uplink control channel (PUCCH) that is carried by the second serving cell, determining, by the base station, that information included in the DCI format of the downlink control channel corresponding to the first serving cell includes a downlink assignment index (DAI) and a 4 bit HARQ process number;

when the duplex mode of the first serving cell is FDD, and the HARQ-ACK corresponding to the first serving cell is fed back in uplink subframes of a radio frame, determining, by the base station, that information included in the DCI format of the downlink control channel corresponding to the first serving cell includes a DAI;

when the duplex mode of the first serving cell is FDD, and:
when the user equipment has a plurality of uplink transmission capabilities in one subframe, determining, by the base station, that information included in the DCI format of the downlink control channel corresponding to the first serving cell includes a 0 bit DAI; and when the user equipment has a single uplink transmission capability in one subframe, determining, by the base station, that information included in the DCI format of the downlink control channel corresponding to the first serving cell includes a DAI; or when the duplex mode of the first serving cell is TDD, a duplex mode of the second serving cell is FDD, and the HARQ-ACK corresponding to the first serving cell is transmitted over a PUCCH that is carried by the second serving cell, determining, by the base station, that information included in the DCI format of the downlink control channel corresponding to the first serving cell includes a 0 bit DAI and a 3 bit HARQ process number.

8. The method according to claim 7, wherein the DCI format of the downlink control channel corresponding to the first serving cell is DCI format 1, DCI format 1A, DCI format 1B, DCI format 1D, DCI format 2, DCI format 2A, DCI format 2B, DCI format 2C, or DCI format 2D.

9. The method according to claim 6, wherein determining, by the base station, the DCI format of the downlink control channel corresponding to the first serving cell, the DCI format being determined according to the duplex mode of the first serving cell and the feedback manner of the HARQ-ACK corresponding to the first serving cell comprises:

when the duplex mode of the first serving cell is frequency division duplex (FDD), a duplex mode of the second serving cell of the user equipment is time division duplex (TDD), and the HARQ-ACK corresponding to the first serving cell is transmitted over a physical uplink control channel (PUCCH) that is carried by the second serving cell, and when the DCI format of the downlink control channel corresponding to the first serving cell is DCI format 0 or DCI format 4, determining, by the base station, that information included in the DCI format of the downlink control channel corresponding to the first serving cell includes a downlink assignment index (DAI) when one or more of uplink-downlink configurations 1-6 are configured for the second serving cell, or when the duplex mode of the first serving cell is TDD, a duplex mode of the second serving cell is FDD, and the HARQ-ACK corresponding to the first serving cell is transmitted over a PUCCH that is carried by the second serving cell, and when the DCI format of the downlink control channel corresponding to the first serving cell is DCI format 0 or DCI format 4, determining, by the base station, that information included in the DCI format of the downlink control channel corresponding to the first serving cell includes a 0 bit DAI when one or more of uplink-downlink configurations 1-6 are configured for the second serving cell.

10. User equipment, comprising:
a processor; and
a non-transitory computer-readable storage medium storing a program to be executed by the processor, the program including instructions for:
whether a feedback manner of a hybrid automatic repeat request-acknowledgment (HARQ-ACK) corresponding to a first serving cell is transmitted via a control channel associated with a second serving cell, wherein the first serving cell is a serving cell corresponding to the user equipment, the second serving cell is a serving cell that corresponds to the user equipment, and the second serving cell uses a duplex mode other than the duplex mode used by the first serving cell;
determining a downlink control information (DCI) format of a downlink control channel corresponding to a first serving cell, wherein the DCI format is determined according to a duplex mode of the first serving cell and the feedback manner of the HARQ-ACK corresponding to the first serving cell; and
detecting the downlink control channel according to the determined DCI format.

11. The user equipment according to claim 10, wherein the program further includes instructions for determining, according to the duplex mode of the first serving cell and the feedback manner of the HARQ-ACK corresponding to the first serving cell, information included in the DCI format of the downlink control channel corresponding to the first serving cell.

12. The user equipment according to claim 11, wherein the program further includes instructions for:

when the duplex mode of the first serving cell is frequency division duplex (FDD), a duplex mode of the second serving cell is time division duplex (TDD), and the HARQ-ACK corresponding to the first serving cell is transmitted over a physical uplink control channel (PUCCH) that is carried by the second serving cell, determining the information included in the DCI format of the downlink control channel corresponding to the first serving cell includes a downlink assignment index (DAI) and a 4 bit HARQ process number;

when the duplex mode of the first serving cell is FDD, and the HARQ-ACK corresponding to the first serving cell is fed back in uplink subframes of a radio frame, determining the information included in the DCI format of the downlink control channel corresponding to the first serving cell includes a DAI;

when the duplex mode of the first serving cell is FDD, and:
　when the user equipment has a plurality of uplink transmission capabilities in one subframe, determining the information included in DCI format of the downlink control channel corresponding to the first serving cell includes a 0 bit downlink assignment index; and
　when the user equipment has a single uplink transmission capability in one subframe, determining the information included in the DCI format of the downlink control channel corresponding to the first serving cell includes a DAI; and
when the duplex mode of the first serving cell is TDD, a duplex mode of the second serving cell of the user equipment is FDD, and the HARQ-ACK corresponding to the first serving cell is transmitted over a PUCCH that is carried by the second serving cell, determining the information included in the DCI format of the downlink control channel corresponding to the first serving cell includes a 0 bit DAI and a 3 bit HARQ process number.

13. The user equipment according to claim 12, wherein the DCI format of the downlink control channel corresponding to the first serving cell is DCI format 1, DCI format 1A, DCI format 1B, DCI format 1D, DCI format 2, DCI format 2A, DCI format 2B, DCI format 2C, or DCI format 2D.

14. The user equipment according to claim 11, wherein the program further includes instructions for:
when the duplex mode of the first serving cell is frequency division duplex (FDD), a duplex mode of the second serving cell of the user equipment is time division duplex (TDD), and the HARQ-ACK corresponding to the first serving cell is transmitted over a physical uplink control channel (PUCCH) that is carried by the second serving cell, and when the DCI format of the downlink control channel corresponding to the first serving cell is DCI format 0 or DCI format 4, determining, by the user equipment, the information included in the DCI format of the downlink control channel corresponding to the first serving cell includes a downlink assignment index (DAI) when one or more of uplink-downlink configurations 1-6 are configured for the second serving cell, or
when the duplex mode of the first serving cell is TDD, a duplex mode of the second serving cell of the user equipment is FDD, and the HARQ-ACK corresponding to the first serving cell is transmitted over a PUCCH that is carried by the second serving cell, and when the DCI format of the downlink control channel corresponding to the first serving cell is DCI format 0 or DCI format 4, determining, by the user equipment, the information included in the DCI format of the downlink control channel corresponding to the first serving cell includes a 0 bit DAI when one or more of uplink-downlink configurations 1-6 is configured for the second serving cell.

15. A base station, comprising:
a processor;
a non-transitory computer-readable storage medium storing a program to be executed by the processor, the program including instructions for:
　determining whether a feedback manner of a hybrid automatic repeat request-acknowledgment (HARQ-ACK) corresponding to a first serving cell is transmitted via a control channel associated with a second serving cell, wherein the first serving cell is a serving cell corresponding to user equipment, the second serving cell is a further serving cell corresponding to the user equipment, and the second serving cell uses a duplex mode other than the duplex mode used by the first serving cell;
　determining, according to a duplex mode of a first serving cell and the feedback manner of the HARQ-ACK corresponding to the first serving cell, a downlink control information (DCI) format of a downlink control channel corresponding to the first serving cell; and
a transmitter, configured to send the downlink control channel according to the determined DCI format.

16. The base station according to claim 15, wherein the program further includes instructions for:
when the duplex mode of the first serving cell is frequency division duplex (FDD), a duplex mode of the second serving cell is time division duplex (TDD), and the HARQ-ACK corresponding to the first serving cell is transmitted over a physical uplink control channel (PUCCH) that is carried by the second serving cell, determining that information included in the DCI format of the downlink control channel corresponding to the first serving cell includes a downlink assignment index (DAI) and a 4 bit HARQ process number;
when the duplex mode of the first serving cell is FDD, and the HARQ-ACK corresponding to the first serving cell is fed back in uplink subframes of a radio frame, determining that information included in the DCI format of the downlink control channel corresponding to the first serving cell includes a DAI;
when the duplex mode of the first serving cell is FDD, and:
　when the user equipment has a plurality of uplink transmission capabilities in one subframe, determining that information included in the DCI format of the downlink control channel corresponding to the first serving cell includes a 0 bit DAI; and
　when the user equipment has a single uplink transmission capability in one subframe, determining that information included in the DCI format of the downlink control channel corresponding to the first serving cell includes a DAI; or
when the duplex mode of the first serving cell is TDD, a duplex mode of the second serving cell is FDD, and the HARQ-ACK corresponding to the first serving cell is transmitted over a PUCCH that is carried by the second serving cell, determining that information included in the DCI format of the downlink control channel corresponding to the first serving cell includes a 0 bit DAI and a 3 bit HARQ process number.

17. The base station according to claim 16, wherein the DCI format of the downlink control channel corresponding to the first serving cell is DCI format 1, DCI format 1A, DCI format 1B, DCI format 1D, DCI format 2, DCI format 2A, DCI format 2B, DCI format 2C, or DCI format 2D.

18. The base station according to claim 15, wherein the program further includes instructions for:
when the duplex mode of the first serving cell is frequency division duplex (FDD), a duplex mode of the second serving cell of the user equipment is time division duplex (TDD), and the HARQ-ACK corresponding to the first serving cell is transmitted over a physical uplink control channel (PUCCH) that is carried by the second serving cell, and when the DCI format of the downlink control channel corresponding to the first serving cell is DCI format 0 or DCI format 4, determining, by the base station, that information included in the DCI format of the downlink control channel corresponding to the first serving cell includes a downlink assignment index (DAI) when one or more of uplink-downlink configurations 1-6 are configured for the second serving cell, or when the duplex mode of the first serving cell is TDD, a duplex mode of the second serving cell is FDD, and the HARQ-ACK corresponding to the first serving cell is transmitted over a PUCCH that is carried by the second serving cell, and when the DCI format of the downlink control channel corresponding to the first serving cell is DCI format 0 or DCI format 4, determining, by the base station, that information included in the DCI format of the downlink control channel corresponding to the first serving cell includes a 0 bit DAI when one or more of uplink-downlink configurations 1-6 are configured for the second serving cell.

* * * * *

UNITED STATES PATENT AND TRADEMARK OFFICE
CERTIFICATE OF CORRECTION

PATENT NO. : 10,623,150 B2
APPLICATION NO. : 15/974938
DATED : April 14, 2020
INVENTOR(S) : Yan Cheng Page 1 of 1

It is certified that error appears in the above-identified patent and that said Letters Patent is hereby corrected as shown below:

In the Claims

In Column 41, Line 11, Claim 7, delete "that serves the user equipment".

Signed and Sealed this
Eighteenth Day of August, 2020

Andrei Iancu
*Director of the United States Patent and Trademark Office*